(12) United States Patent
Ma et al.

(10) Patent No.: US 11,902,943 B2
(45) Date of Patent: Feb. 13, 2024

(54) COMMUNICATION METHOD AND COMMUNICATIONS APPARATUS

(71) Applicant: Huawei Technologies Co., Ltd., Shenzhen (CN)

(72) Inventors: Ruixiang Ma, Beijing (CN); Shengyu Li, Beijing (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 515 days.

(21) Appl. No.: 17/164,440

(22) Filed: Feb. 1, 2021

(65) Prior Publication Data

US 2021/0160839 A1 May 27, 2021

Related U.S. Application Data

(63) Continuation of application No. PCT/CN2019/099108, filed on Aug. 2, 2019.

(30) Foreign Application Priority Data

Aug. 2, 2018 (CN) .......................... 201810868998.5

(51) Int. Cl.
*H04W 72/044* (2023.01)
*H04L 5/00* (2006.01)
*H04W 72/1273* (2023.01)

(52) U.S. Cl.
CPC ......... *H04W 72/044* (2013.01); *H04L 5/0055* (2013.01); *H04W 72/1273* (2013.01)

(58) Field of Classification Search
None
See application file for complete search history.

(56) References Cited

U.S. PATENT DOCUMENTS

2010/0111024 A1* 5/2010 Fan ........................ H04L 1/1861
370/329
2011/0243066 A1* 10/2011 Nayeb Nazar ........ H04L 1/0073
370/328
(Continued)

FOREIGN PATENT DOCUMENTS

CN 101499882 A 8/2009
CN 102468937 A 5/2012
(Continued)

OTHER PUBLICATIONS

"Remaining Issues of ACK/NAK Multiplexing on PUSCH," 3GPP TSG-RAN-WG1 Meeting #55, R1-084344, Prague, CZ, XP050317616, Total 4 pages, 3rd Generation Partnership Project, Valbonne, France (Nov. 10-14, 2008).

*Primary Examiner* — Clemence S Han
(74) *Attorney, Agent, or Firm* — Leydig, Voit & Mayer, Ltd.

(57) ABSTRACT

A communication method and a communications apparatus are provided. A principle of the method is as follows. Currently, for downlink data transmitted in a semi-persistent scheduling manner, only 1-bit acknowledgment information can be fed back in one time unit. However, as a transmission periodicity P of the downlink data transmitted in the semi-persistent scheduling manner becomes smaller, multi-bit acknowledgment information may need to be fed back in one time unit. In view of this, this application provides a communication method and a communications apparatus to feed back multi-bit acknowledgment information in one time unit. First, multi-bit acknowledgment information to-be-sent in one time unit is determined; then N acknowledgment codebooks are generated, where the N acknowledgment codebooks are used to carry the multi-bit
(Continued)

acknowledgment information; and finally, the N acknowledgment codebooks are sent in the time unit.

14 Claims, 11 Drawing Sheets

(56) References Cited

U.S. PATENT DOCUMENTS

| | | | |
|---|---|---|---|
| 2015/0257150 A1* | 9/2015 | Yi | H04B 7/26 370/329 |
| 2019/0215781 A1* | 7/2019 | Jeon | H04W 52/325 |
| 2019/0230685 A1* | 7/2019 | Park | H04W 72/12 |
| 2019/0253986 A1* | 8/2019 | Jeon | H04L 5/0048 |
| 2019/0254110 A1* | 8/2019 | He | H04L 5/0048 |
| 2019/0306923 A1* | 10/2019 | Xiong | H04J 13/0062 |
| 2019/0342907 A1* | 11/2019 | Huang | H04W 72/23 |
| 2019/0349964 A1* | 11/2019 | Liou | H04W 76/27 |
| 2021/0153185 A1* | 5/2021 | Schober | H04L 5/0051 |

FOREIGN PATENT DOCUMENTS

| | | | |
|---|---|---|---|
| CN | 106105078 | A | 11/2016 |
| CN | 106160957 | A | 11/2016 |
| CN | 107734652 | A | 2/2018 |
| EP | 3251260 | A1 | 12/2017 |
| WO | 2012047908 | A1 | 4/2012 |
| WO | 2016122243 | A1 | 8/2016 |
| WO | 2017160350 | A1 | 9/2017 |

\* cited by examiner

COMMUNICATION METHOD AND COMMUNICATIONS APPARATUS

CROSS-REFERENCE TO RELATED APPLICATIONS

This application is a continuation of International Application No. PCT/CN2019/099108, filed on Aug. 2, 2019, which claims priority to Chinese Patent Application No. 201810868998.5, filed on Aug. 2, 2018. The disclosures of the aforementioned applications are hereby incorporated by reference in their entireties.

TECHNICAL FIELD

This application relates to the field of communications technologies, and in particular, to a communication method and a communications apparatus.

BACKGROUND

Compared with previous generations of mobile communications systems, a 5th generation (5G) mobile communications system imposes higher requirements on a transmission rate, a latency, power consumption, and the like. An enhanced mobile broadband (eMBB) service, a massive machine-type communications (mMTC) service, and an ultra-reliable and low-latency communication (URLLC) service are defined as three typical services of 5G in the future. The three services are key points of 5G standard formulation.

As one of the three typical services of 5G, the URLLC service is mainly used in scenarios such as self-driving and telemedicine. Higher requirements on reliability and the latency are imposed for these application scenarios. For example, specific requirements of the URLLC service include that data transmission reliability reaches 99.999%, a transmission latency is less than 1 ms, and so on. In addition, instruction overheads need to be reduced as much as possible in the premise of meeting the requirements for high reliability and a low latency. Therefore, how to ensure the latency and the reliability of the URLLC service and reduce signaling overheads becomes a problem that is of great concern in the field.

To ensure the latency and the reliability of the URLLC service and reduce the signaling overheads, a transmit end may send data by using a semi-persistent scheduling (SPS) technology. However, there is no corresponding solution for how a receive end feeds back acknowledgment data.

SUMMARY

This application provides a communication method and a communications apparatus, to help a receive end feed back acknowledgment information.

According to a first aspect, a communication method is provided. The method may be used in a terminal device or a chip in a terminal device, and may specifically include: first determining M-bit acknowledgment information to be sent in a target time unit; then, determining N acknowledgment codebooks based on the M-bit acknowledgment information, where the N acknowledgment codebooks are used to carry the M-bit acknowledgment information; and finally, sending the N acknowledgment codebooks in the target time unit, where both M and N are integers, and at least one of M and N is not 1.

In this embodiment of this application, when M is greater than 1, multi-bit acknowledgment information may be fed back in one target time unit. Compared with the prior art in which only 1-bit acknowledgment information can be fed back in one time unit, this embodiment can improve feedback efficiency of the feedback information.

In a possible implementation, a value of M is K*[Q/P]. P is a transmission periodicity of first downlink data, Q is a length of the target time unit, K is a quantity of time units used to transmit the first downlink data, values of P, Q, and K are all positive integers, and [ ] represents rounding Q/P.

In this embodiment of this application, a quantity of bits of the acknowledgment information is calculated based on the periodicity P of the first downlink data and the length Q of the target time unit, to overcome a technical defect in the prior art that only 1-bit acknowledgment information is fed back, and resolve a problem that acknowledgment information for some downlink data cannot be fed back, thereby improving data transmission efficiency.

In a possible implementation, each of N−1 acknowledgment codebooks in the N acknowledgment codebooks includes floor(M/N)-bit acknowledgment information, and the remaining acknowledgment codebook includes M−(N−1)*floor(M/N)-bit acknowledgment information, where floor represents a rounding down operation, and N is greater than 1.

Specifically, each acknowledgment codebook whose index number is less than or equal to N−1 in the N acknowledgment codebooks includes the floor(M/N)-bit acknowledgment information, and an acknowledgment codebook whose index number is N in the N acknowledgment codebooks includes the M−(N−1)*floor(M/N)-bit acknowledgment information. Alternatively, an acknowledgment codebook whose index number is 1 in the N acknowledgment codebooks includes the M−(N−1)*floor (M/N)-bit acknowledgment information, and each acknowledgment codebook whose index number is greater than 1 in the N acknowledgment codebooks includes the floor(M/N)-bit acknowledgment information.

In this embodiment of this application, compared with distribution of the M-bit acknowledgment information into one codebook for transmission, distribution of the M-bit acknowledgment information into a plurality of codebooks for transmission results in higher transmission reliability of the M-bit acknowledgment information. For example, if one codebook is used to transmit the M-bit acknowledgment information, and a problem occurs in transmission of the codebook, none of the M-bit acknowledgment information can be correctly received. However, in this embodiment of this application, each of the N acknowledgment codebooks includes a part of the acknowledgment information. If a problem occurs in transmission of an acknowledgment codebook, only a part, of the acknowledgment information, carried in the acknowledgment codebook is affected, and a case in which none of the M-bit acknowledgment information can be correctly received is avoided.

In a possible implementation, each of the N acknowledgment codebooks includes the M-bit acknowledgment information, where N is greater than 1. Alternatively, an $i^{th}$ acknowledgment codebook in the N acknowledgment codebooks includes the M-bit acknowledgment information, where N is greater than 1 and i is a positive integer less than or equal to N. Alternatively, a value of N is 1, and the acknowledgment codebook includes the M-bit acknowledgment information.

In this embodiment of this application, each of the N acknowledgment codebooks includes the M-bit acknowledgment information. Compared with a case in which only one of the N acknowledgment codebooks carries the M-bit acknowledgment information, this embodiment can improve transmission reliability of the M-bit acknowledgment information. If a problem occurs in transmission of an acknowledgment codebook, the M-bit acknowledgment information can still be correctly received.

In a possible implementation, the method according to the first aspect may further include: receiving first indication information, where the first indication information is used to indicate N time-frequency resources.

In a possible implementation, the method according to the first aspect may further include: receiving second indication information, where the second indication information is used to indicate P1 time-frequency resource sets, P1 is a positive integer, and each time-frequency resource set includes N time-frequency resources; receiving third indication information, where the third indication information is used to indicate an index of a first time-frequency resource set in the P1 time-frequency resource sets; and determining, based on the index of the first time-frequency resource set, N time-frequency resources in the target time unit that are used to transmit the N acknowledgment codebooks.

In a possible implementation, the method according to the first aspect may further include: receiving fourth indication information, where the fourth indication information is used to indicate N time-frequency resource sets, and each time-frequency resource set includes P2 time-frequency resources, where P2 is a positive integer; receiving fifth indication information, where the fifth indication information is used to indicate an index of a time-frequency resource in each of the N time-frequency resource sets; and determining, based on the index of the time-frequency resource, N time-frequency resources in the target time unit that are used to transmit the N acknowledgment codebooks.

In this embodiment of this application, a network device may indicate the N time-frequency resources, and the terminal device may send the N acknowledgment codebooks on the N time-frequency resources indicated by the network device. One time-frequency resource is used to carry one acknowledgment codebook, so that the network device flexibly indicates the time-frequency resources used by the terminal device to send the acknowledgment information.

In a possible implementation, the N acknowledgment codebooks further include acknowledgment information for second downlink data, and the second downlink data is transmitted in a dynamic scheduling manner.

In this embodiment of this application, the feedback information for the first downlink data is added after or before the feedback information for the second downlink data that is normally scheduled, and then fed back together with the feedback information for the second downlink data that is normally scheduled, to reduce implementation complexity.

According to a second aspect, this application further provides a communication method. The communication method may be used in a network device or a chip in a network device, and may specifically include:

receiving N acknowledgment codebooks on N time-frequency resources in a target time unit, where each of the N time-frequency resources carries one of the N acknowledgment codebooks, and the N acknowledgment codebooks are used to carry M-bit acknowledgment information, where both M and N are positive integers, and at least one of M and N is not 1; and the M-bit acknowledgment information is acknowledgment information for first downlink data, and the first downlink data is transmitted in a semi-persistent scheduling manner; and determining, based on the N acknowledgment codebooks, whether to retransmit the first downlink data.

In a possible implementation, a value of M is K*[Q/P]. P is a transmission periodicity of the first downlink data, Q is a length of the target time unit, K is a quantity of time units used to transmit the first downlink data, values of P, Q, and K are all positive integers, and [ ] represents rounding Q/P.

In a possible implementation, that the N acknowledgment codebooks are used to carry M-bit acknowledgment information specifically includes:

each of N−1 acknowledgment codebooks in the N acknowledgment codebooks includes floor(M/N)-bit acknowledgment information, and the remaining acknowledgment codebook includes M−(N−1)*floor(M/N)-bit acknowledgment information, where floor represents a rounding down operation, and N is greater than 1; or each of the N acknowledgment codebooks includes the M-bit acknowledgment information, where N is greater than 1; or an $i^{th}$ acknowledgment codebook in the N acknowledgment codebooks includes the M-bit acknowledgment information, where N is greater than 1 and i is a positive integer less than or equal to N; or a value of N is 1, and the acknowledgment codebook includes the M-bit acknowledgment information.

In a possible implementation, that each of N−1 acknowledgment codebooks in the N acknowledgment codebooks includes floor(M/N)-bit acknowledgment information, and the remaining acknowledgment codebook includes M−(N−1)*floor(M/N)-bit acknowledgment information is specifically:

each of the first N−1 acknowledgment codebooks in the N acknowledgment codebooks includes the floor(M/N)-bit acknowledgment information, and the last acknowledgment codebook in the N acknowledgment codebooks includes the M−(N−1)*floor(M/N)-bit acknowledgment information; or the first acknowledgment codebook in the N acknowledgment codebooks includes the M−(N−1)*floor(M/N)-bit acknowledgment information, and each of the last N−1 acknowledgment codebooks in the N acknowledgment codebooks includes the floor(M/N)-bit acknowledgment information.

In a possible implementation, the method further includes: sending first indication information, where the first indication information is used to indicate the N time-frequency resources.

In a possible implementation, the method further includes: sending second indication information, where the second indication information is used to indicate P1 time-frequency resource sets, P1 is a positive integer, and each time-frequency resource set includes N time-frequency resources; and sending third indication information, where the third indication information is used to indicate an index of a first time-frequency resource set in the P1 time-frequency resource sets.

In a possible implementation, the method may further include: sending fourth indication information, where the fourth indication information is used to indicate N time-frequency resource sets, and each time-frequency resource set includes P2 time-frequency resources, where P2 is a positive integer; and sending fifth indication information, where the fifth indication information is used to indicate an index of a time-frequency resource in each of the N time-frequency resource sets.

In a possible implementation, the N acknowledgment codebooks further include acknowledgment information for second downlink data, and the second downlink data is transmitted in a dynamic scheduling manner.

For descriptions of beneficial effects of the second aspect, refer to the descriptions set forth in the first aspect.

According to a third aspect, this application further provides a communication method. The communication method may be used in a terminal device, and may include: first determining M-bit acknowledgment information for first downlink data, and dividing the M-bit acknowledgment information into N1 groups of acknowledgment information; then determining acknowledgment information for second downlink data, and dividing the acknowledgment information for the second downlink data into N2 groups of acknowledgment information, where each group of acknowledgment information corresponds to one time-frequency resource, the N1 groups of acknowledgment information correspond to N1 time-frequency resources in total, and the N2 groups of acknowledgment information correspond to N2 time-frequency resources in total; then determining N time-frequency resources based on an overlapping relationship between the N1 time-frequency resources and the N2 time-frequency resources; and finally determining N acknowledgment codebooks corresponding to the N time-frequency resources, and sending the N acknowledgment codebooks on the N time-frequency resources.

In a possible implementation, the acknowledgment codebook may be used only to carry the acknowledgment information for the first downlink data, or may be used only to carry the acknowledgment information for the second downlink data, or may be used to carry both the acknowledgment information for the first downlink data and the acknowledgment information for the second downlink data.

In a possible implementation, for a time-frequency resource q in the N time-frequency resources, if the time-frequency resource q is a time-frequency resource that is re-determined based on an overlapping time-frequency resource between the N1 time-frequency resources and the N2 time-frequency resources, an acknowledgment codebook corresponding to the time-frequency resource q may be used to carry the acknowledgment information for the first downlink data and the acknowledgment information for the second downlink data. If the time-frequency resource q is a time-frequency resource in the N1 time-frequency resources, an acknowledgment codebook corresponding to the time-frequency resource q may be used to carry the acknowledgment information corresponding to the first downlink data. If the time-frequency resource q is a time-frequency resource in the N2 time-frequency resources, an acknowledgment codebook corresponding to the time-frequency resource q may be used to carry the acknowledgment information for the second downlink data.

In a possible implementation, for a time-frequency resource p in the N1 time-frequency resources, if the time-frequency resource p overlaps a plurality of time-frequency resources in the N2 time-frequency resources, where the overlapping may be complete overlapping or partial overlapping, acknowledgment information, for the first downlink data, corresponding to the time-frequency resource p is added before or after acknowledgment information, for the second downlink data, corresponding to one of the plurality of time-frequency resources in the N2 time-frequency resources, to form an acknowledgment codebook; or acknowledgment information, for the first downlink data, corresponding to the time-frequency resource p is added before or after acknowledgment information, for the second downlink data, corresponding to each of the plurality of time-frequency resources in the N2 time-frequency resources, to form a plurality of acknowledgment codebooks.

In another example of this application, for a time-frequency resource p in the N1 time-frequency resources, if the time-frequency resource p overlaps one time-frequency resource r in the N2 time-frequency resources, acknowledgment information, for the first downlink data, corresponding to the time-frequency resource p may be added before or after acknowledgment information, for the second downlink data, corresponding to the time-frequency resource r, to form an acknowledgment codebook.

It can be learned that in this embodiment of this application, if two time-frequency resources overlap, acknowledgment information corresponding to the two time-frequency resources may be carried in one acknowledgment codebook for transmission. Compared with a case in which if two time-frequency resources overlap, two acknowledgment codebooks are transmitted on the two overlapping time-frequency resources, this embodiment can reduce a workload on a terminal device side and improve efficiency of transmitting the acknowledgment codebooks.

According to a fourth aspect, this application provides a communication method. The communication method may be used in a network device, and may include: receiving N acknowledgment codebooks on N time-frequency resources, and determining, based on the received N acknowledgment codebooks, whether to retransmit first downlink data and second downlink data.

For descriptions of specific acknowledgment information carried in the N acknowledgment codebooks, a process of determining the N time-frequency resources, and beneficial effects, refer to the descriptions set forth in the third aspect.

According to a fifth aspect, this application provides a communications apparatus. The communications apparatus is used in a terminal device or a chip in a terminal device, and includes a unit or means configured to perform each step according to the first aspect or the third aspect.

According to a sixth aspect, this application provides a communications apparatus. The communications apparatus is used in a network device or a chip in a network device, and includes a unit or means configured to perform each step according to the second aspect or the fourth aspect.

According to a seventh aspect, this application provides a communications apparatus. The communications apparatus is used in a terminal device or a chip in a terminal device, and includes at least one processing element and at least one storage element, where the at least one storage element is configured to store a program and data, and the at least one processing element is configured to perform the method according to the first aspect or the third aspect of this application.

According to an eighth aspect, this application provides a communications apparatus. The communications apparatus is used in a network device or a chip in a network device, and includes at least one processing element and at least one storage element, where the at least one storage element is configured to store a program and data, and the at least one processing element is configured to perform the method according to the second aspect or the fourth aspect of this application.

According to a ninth aspect, this application provides a communications apparatus. The communications apparatus is used in a terminal device, and includes at least one processing element (or chip) configured to perform the method according to the first aspect or the third aspect.

According to a tenth aspect, this application provides a communications apparatus. The communications apparatus is used in a network device, and includes at least one processing element (or chip) configured to perform the method according to the second aspect or the fourth aspect.

According to an eleventh aspect, this application provides a computer program product, where the computer program product includes a computer instruction, and when the computer instruction is executed by a computer, the computer is enabled to perform the method according to any one of the foregoing aspects.

According to a twelfth aspect, this application provides a computer-readable storage medium, where the storage medium stores a computer instruction, and when the computer instruction is executed by a computer, the computer is enabled to perform the method according to any one of the foregoing aspects.

DESCRIPTION OF EMBODIMENTS

The following describes technical solutions in embodiments of this application with reference to the accompanying drawings in the embodiments of this application.

Figure 1:
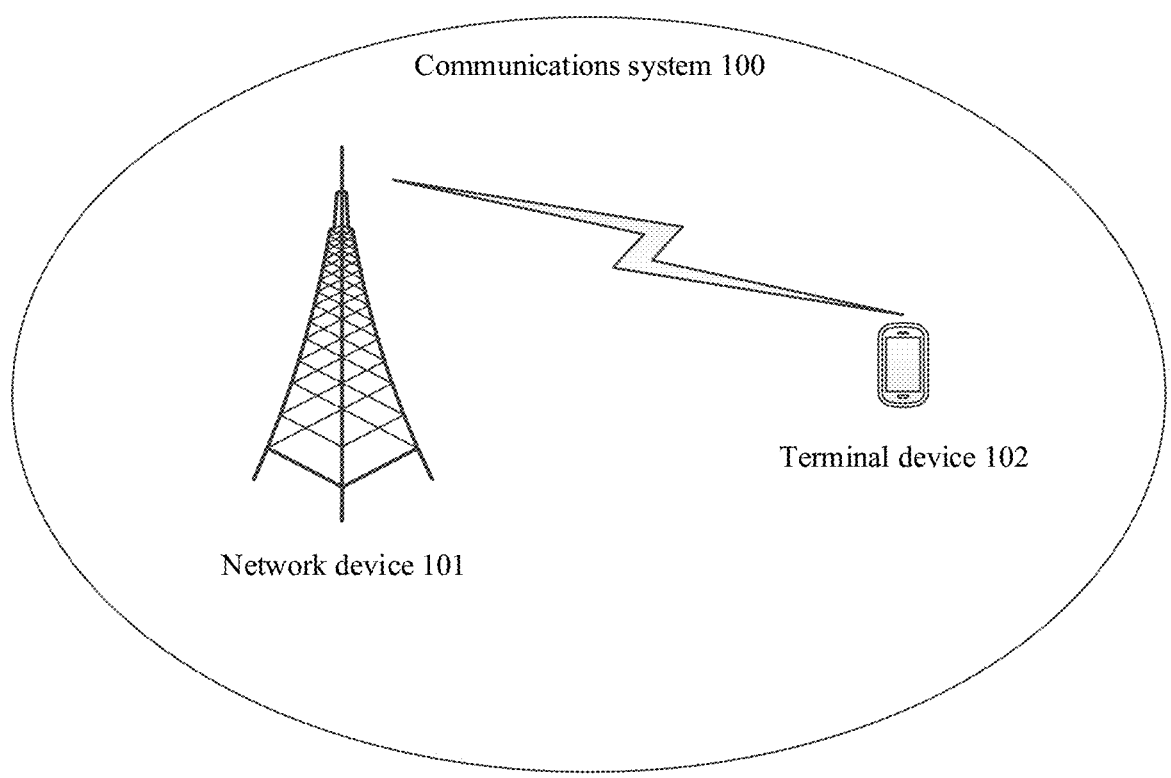
FIG. 1 is a schematic diagram of a communications system according to an embodiment of this application.

FIG. 1 shows a communications system 100 according to an embodiment of this application. The communications system 100 may include a network device 101 and a terminal device 102.

The network device 101 may provide a wireless access-related service for the terminal device 102, and implement one or more of the following functions: a wireless physical layer function, resource scheduling and wireless resource management, quality of service (QoS) management, wireless access control, and a mobility management function. The terminal device 102 may access the network device 101 through an air interface.

In this embodiment of this application, the network device 101 and the terminal device 102 may communicate with each other by using a semi-persistent scheduling (SPS) technology. A working process may be as follows: Before sending downlink data, the network device 101 may first send activation downlink control information (DCI), where the activation DCI is used to schedule transmission of the downlink data and indicate a time-frequency resource for the downlink data. Correspondingly, after receiving the activation DCI, the terminal device 102 may receive, on the corresponding time-frequency resource based on an indication of the DCI, the downlink data sent by the network device 101. Subsequently, the network device 101 may continue to send downlink data based on a preconfigured periodicity P. Correspondingly, the terminal device 102 may continue to receive the downlink data based on the preconfigured periodicity P. It can be learned that in the SPS technology, the network device 101 can transmit downlink data for a plurality of times by sending one piece of activation DCI. Compared with an existing manner in which the network device 101 sends one piece of activation DCI each time before sending downlink data, the SPS technology can reduce signaling overheads.

In addition, in the SPS technology, to ensure data transmission reliability, after receiving each piece of downlink data sent by the network device 101, the terminal device 102 needs to feed back acknowledgment information to the network device 101. The acknowledgment information may be an acknowledgment (ACK) or a negative acknowledgment (NACK). The terminal device 102 may determine, in the following manner, a time unit for feeding back the acknowledgment information: first determining a time unit offset K1, and then determining, based on the time unit offset K1, the time unit for feeding back the acknowledgment information. For example, if the terminal device 102 receives the downlink data in a time unit n, the terminal device 102 may feed back the acknowledgment information in a time unit n+K1, where the time unit offset K1 may be indicated by using the foregoing activation DCI, or a K1 set may be preconfigured for the terminal device by using configuration information, and the K1 set includes one or more K1 values. If the K1 set includes only one K1 value, for ease of description, the K1 value included in the K1 set may be referred to as a first K1 value. In this case, the terminal device may feed back the acknowledgment information in a time unit n+the first K1 value. If the K1 set includes a plurality of K1 values, for ease of description, the K1 values included in the K1 set may be referred to as a first K1 value, a second K1 value, . . . , and an $N^{th}$ K1 value. In this case, the terminal device may separately feed back the acknowledgment information in a time unit n+the first K1 value, a time unit n+the second K1 value, . . . , and a time unit n+the $N^{th}$ K1 value. However, there is no corresponding solution for how to feed back the acknowledgment information in the time unit.

For ease of understanding, descriptions of concepts related to this application are provided as examples for reference, and details are as follows:

(1) First downlink data: The first downlink data is downlink data transmitted in an SPS manner, or is downlink data transmitted in a configured-grant manner. The downlink data transmitted in the SPS manner includes: SPS downlink data scheduled by using initial activation DCI and downlink data subsequently transmitted based on a configured SPS periodicity P. Alternatively, the downlink data transmitted in the SPS manner does not include downlink data scheduled by using initial activation DCI, but includes only downlink data subsequently transmitted based on a configured SPS periodicity P. The downlink data transmitted in the configured-grant manner may be specifically: There is no corresponding DCI in a data transmission process, and downlink data transmitted based only on configuration information. That is, in an entire downlink data transmission process, neither a physical downlink control channel (PDCCH) for activating a data transmission process nor a PDCCH for releasing a data transmission resource is sent, where the PDCCH may be used to carry DCI. The first downlink data may be specifically one piece of downlink data, or may be a plurality of pieces of downlink data.

(2) Acknowledgment information: The acknowledgment information may be specifically an acknowledgment ACK or a negative acknowledgment NACK. A size of acknowledgment information for a transport block may be one bit. For example, binary data 1 may be used to represent the acknowledgment ACK, and binary data 0 may be used to represent the negative acknowledgment NACK. Alternatively, binary data 0 may be used to represent the acknowledgment ACK, and binary data 1 may be used to represent the negative acknowledgment NACK.

(3) Time unit: The time unit may be referred to as, but is not limited to, names such as a slot, a subframe, a symbol, and a frame. The time unit may be one or more symbols, one or more slots, one or more subframes, or one or more radio frames. For example, a length of the time unit may be one slot, ½ of a slot, ⅐ of a slot, or the like. This is not limited in this application. The length of the time unit may be specifically specified in a protocol or configured by using higher layer signaling. In this application, the symbol may be an orthogonal frequency division multiplexing (OFDM) symbol.

(4) Acknowledgment codebook: A feedback information bit sequence formed by concatenating a plurality of pieces of acknowledgment information in a specific order is referred to as the acknowledgment codebook.

(5) Second downlink data: The second downlink data is downlink data transmitted in a dynamic scheduling manner. To be specific, before sending each piece of downlink data, a network device needs to send downlink control information (DCI) to a terminal device, and the terminal device may receive the downlink data based on scheduling by DCI. Specifically, the downlink data transmitted in the dynamic scheduling manner may include SPS downlink data scheduled by using activation DCI and downlink data scheduled by using common DCI (non-SPS-activation DCI); or may not include SPS downlink data scheduled by using activation DCI but include only downlink data scheduled by using common DCI.

(6) Network device: The network device may be a device that is in a network and that connects a terminal device to a wireless network. The network device is a node in a radio access network, and may also be referred to as a base station or a radio access network (RAN) node (or device). Currently, some examples of the network device are: a gNB, a transmission reception point (TRP), an evolved NodeB (eNB), a home base station (for example, a home evolved NodeB or a home NodeB, HNB), a baseband unit (BBU), or a Wi-Fi access point (AP). In addition, in a network structure, the network device may include a centralized unit (CU) node and a distributed unit (DU) node. In this structure, protocol layers of an eNB in a long term evolution (LTE) system are split, where functions of some protocol layers are centrally controlled by the CU, functions of some or all of remaining protocol layers are distributed in the DU, and the CU centrally controls the DU.

(7) Terminal device: The terminal device is also referred to as user equipment (UE), a mobile station (MS), a mobile terminal (MT), or the like, and is a device, for example, a handheld device having a wireless connection function or a vehicle-mounted device, that provides voice and/or data connectivity for a user. Currently, some examples of the terminal are: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, or a wireless terminal in a smart home.

(8) Communications system: The communications system may use various radio access technologies (RAT), for example, code division multiple access (CDMA), time division multiple access (TDMA), frequency division multiple access (FDMA), orthogonal frequency division multiple access (OFDMA), and single carrier frequency division multiple access (SC-FDMA). A RAT used in the communications system is not limited in this application. The terms "system" and "network" may be used interchangeably in this application.

A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of a network architecture and emergence of new service scenarios, the technical solutions provided in the embodiments of this application can also be used for similar technical problems.

(9) Higher layer signaling: The higher layer signaling may be signaling sent from a higher-layer protocol layer. The higher-layer protocol layer is a protocol layer above a physical layer. The higher-layer protocol layer may be specifically: a medium access control (MAC) layer, a radio link control (RLC) layer, a packet data convergence protocol (PDCP) layer, a radio resource control (RRC) layer, and a non-access stratum (NAS).

(10) floor(A): floor(A) indicates performing a rounding down operation on "A". For example, if "A" is 7/2, floor(7/2)=3.

In addition, it should be understood that, in descriptions of this application, terms such as "first" and "second" are merely used for differentiation and description, but cannot be understood as an indication or implication of relative importance or an indication or implication of an order.

Figure 2:
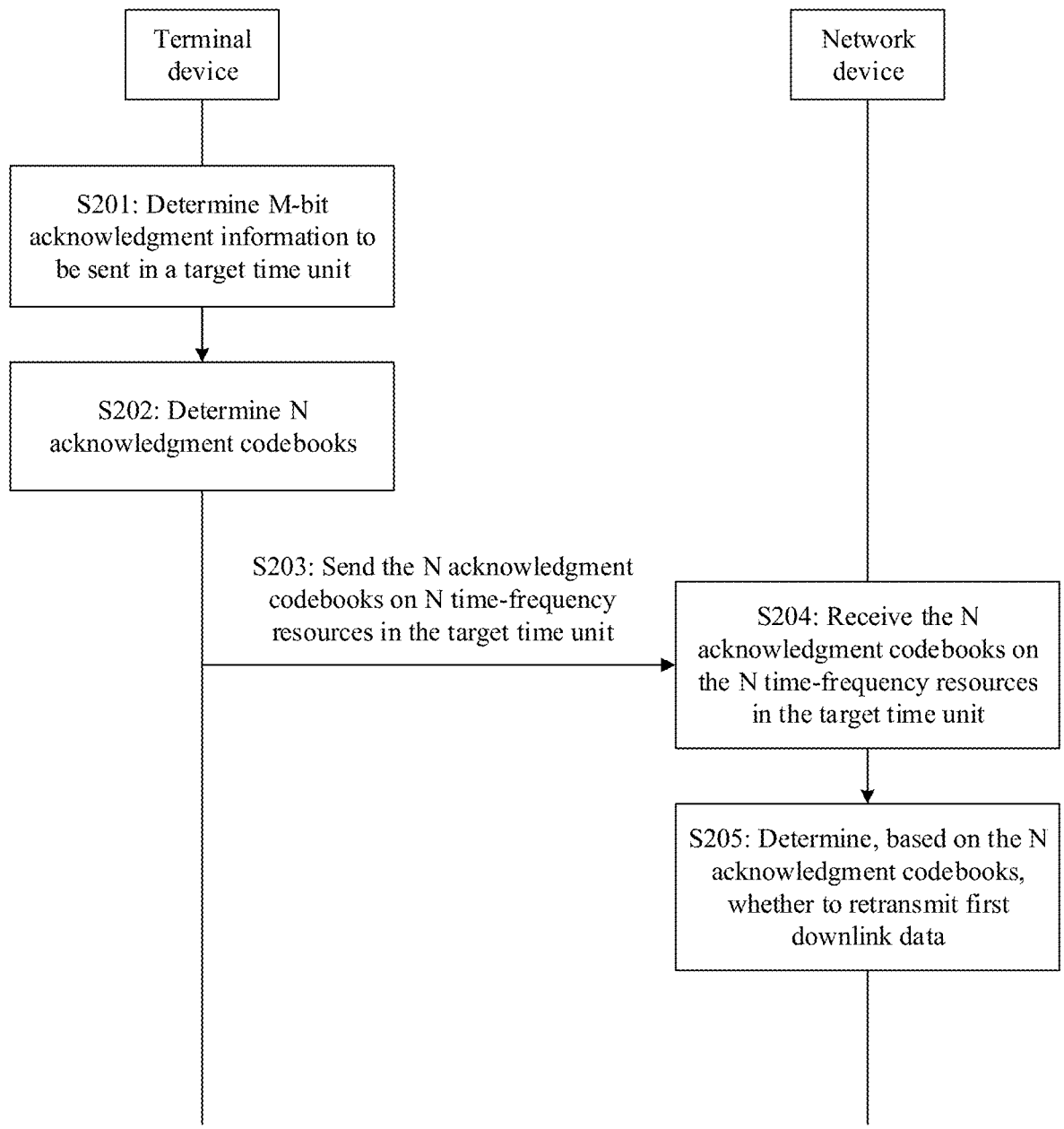
FIG. 2 is a schematic diagram of a communication method according to an embodiment of this application.

FIG. 2 is a flowchart of a communication method according to this application. A network device in this procedure may be specifically the network device 101 shown in FIG. 1, and a terminal device may be specifically the terminal device 102 shown in FIG. 1. It may be understood that in this application, a function of the network device may alternatively be implemented by using a chip used in the network device, and a function of the terminal device may alternatively be implemented by using a chip used in the terminal device. The procedure is specifically as follows:

Step S201: The terminal device determines M-bit acknowledgment information to be sent in a target time unit, where the M-bit acknowledgment information is acknowledgment information for first downlink data.

In this embodiment of this application, a value of M may be $K*[Q/P]$, K is a quantity of time units used to transmit the first downlink data, Q is a length of the target time unit, the length Q of the target time unit may be specified in a protocol or configured by using higher layer signaling, P is a transmission periodicity of the first downlink data, [ ] represents rounding Q/P, the rounding may be specifically rounding up, rounding down, rounding off, or the like, * represents a multiplication sign, / represents a division sign, and values of K, Q, and P are all positive integers.

In this embodiment of this application, if the first downlink data is transmitted in one time unit, in other words, the value of the quantity K of time units used to transmit the first downlink data is 1, the value of M is [Q/P]. Specifically, if a time length of the periodicity P is less than or equal to the length Q of the target time unit, the value of M is [Q/P]. If a time length of the periodicity P is greater than the length Q of the target time unit, the value of M is ceil(Q/P), that is, the value of M is 1, where ceil represents a rounding up operation. For example, if the periodicity P is two symbols, and the time length Q is 14 symbols, M is equal to 7. If the periodicity P is 28 symbols, and the time length Q is 14 symbols, M is equal to 1. It should be noted that, in a formula, units of P and Q are consistent, and may be both symbols, slots, subframes, or frames.

In this embodiment of this application, the value of M is described by using an example in which the time unit is a slot and it is assumed that the network device transmits downlink data in an SPS manner in a slot n and acknowledgment information is fed back in a slot n+2.

Figure 3:
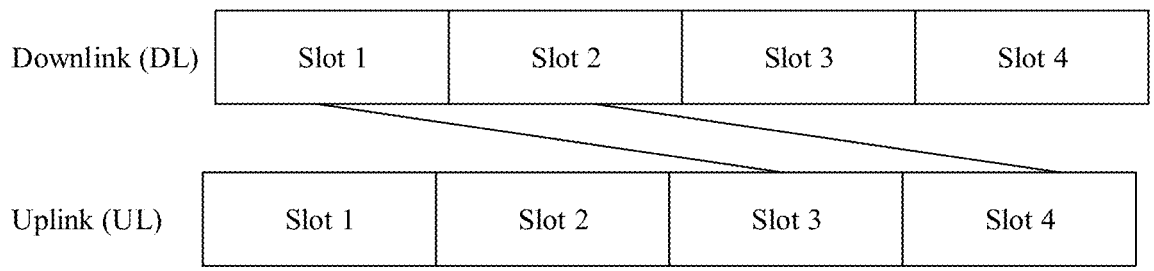
FIG. 3 is a schematic diagram of feedback of acknowledgment information in an FDD working mode according to this application.

As shown in FIG. 3, in a frequency division duplex (FDD) system, the network device sends downlink data in an SPS manner in a slot 1, and a periodicity P of sending the downlink data is seven symbols. Because the slot 1 includes 14 symbols, and the periodicity of sending the downlink data by the network device is seven symbols, the network device sends two pieces of downlink data in total in the downlink slot 1. According to the foregoing rule that the acknowledgment information is fed back in the slot n+2, the terminal device may feed back, in an uplink slot 3, acknowledgment information for the downlink data that is sent in the slot 1, where the acknowledgment information may be an acknowledgment ACK or a negative acknowledgment NACK, and each piece of acknowledgment information occupies one bit. It can be learned that, 2-bit acknowledgment information needs to be fed back in total in the slot 3. This conforms to the foregoing formula M=[Q/P]. A process of feeding back acknowledgment information in an uplink slot 4 is similar to the process of feeding back the acknowledgment information in the slot 3, and details are not described again.

In this embodiment of this application, if the first downlink data is transmitted in a plurality of time units, in other words, the value of the quantity K of time units used to transmit the first downlink data is greater than 1, the value of M is $K*[Q/P]$. Specifically, if the periodicity P is less than or equal to the length Q of the target time unit, the value of M is $K*[Q/P]$. If the periodicity P is greater than the length Q of the target time unit, the value of M is K*ceil(Q/P), that is, the value of M is K. For example, if K=3, the periodicity P is two symbols, and the time length Q is 14 symbols, M may be equal to 21. If K=2, the periodicity P is 28 symbols, and the time length Q is 14 symbols, M may be equal to 2.

In this embodiment of this application, the value of M is described by using an example in which the time unit is a slot and it is assumed that the network device transmits downlink data in an SPS manner in a slot n and acknowledgment information is fed back in a slot n+2.

Figure 4:
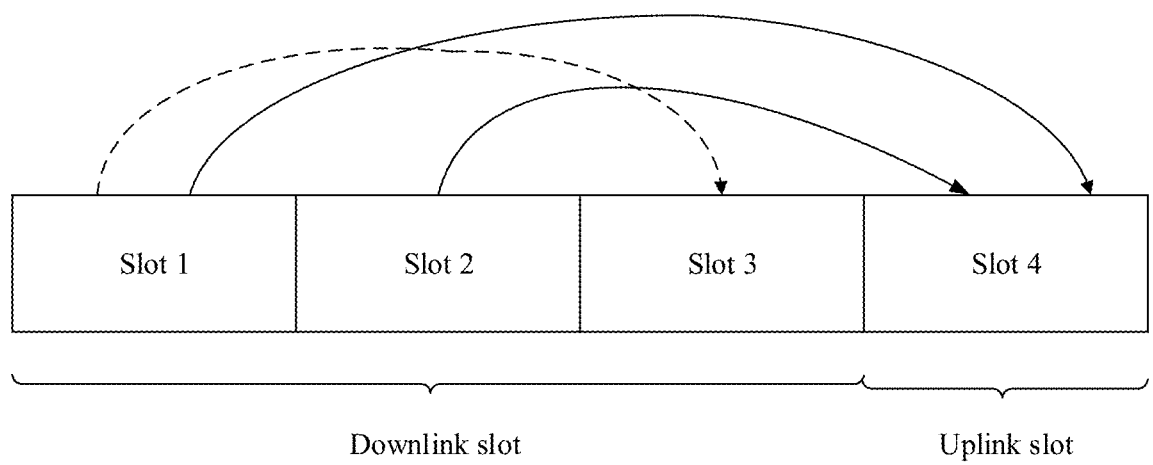
FIG. 4 is a schematic diagram of feedback of acknowledgment information in a TDD working mode according to this application.

As shown in FIG. 4, in a time division duplex (time division duplex, TDD) system, a slot 1, a slot 2, and a slot 3 are downlink slots, and a slot 4 is an uplink slot. The network device sends downlink data in the slot 1 and the slot 2. According to the rule that the terminal device feeds back the acknowledgment information in the slot n+2, the terminal device may feed back, in the slot 3, acknowledgment information for the downlink data that is sent in the slot 1, and may feed back, in the slot 4, acknowledgment information for the downlink data that is sent in the slot 2. Because the slot 3 is a downlink slot, actually, the terminal device may feed back, in the slot 4, the acknowledgment information for the downlink data that is sent in the two slots, namely, the slot 1 and the slot 2. In this embodiment of this application, it is assumed that a periodicity P of sending the downlink data by the network device is seven symbols, and one slot Q includes 14 symbols in total. In this case, two pieces of downlink data are sent in each of the slot 1 and the slot 2. Correspondingly, acknowledgment information for four pieces of downlink data needs to be fed back in the slot 4, and acknowledgment information for each piece of downlink data occupies one bit. In this case, 4-bit acknowledgment information needs to be fed back in total in the slot 4. Because the acknowledgment information for the downlink data that is sent in the two slots, namely, the slot 1 and the slot 2, needs to be fed back in the slot 4, a value of K is 2, a value of P is seven symbols, and a value of Q is 14 symbols. It can be learned that finally feeding back 4-bit acknowledgment information in the slot 4 conforms to the foregoing formula $M=K*[Q/P]$.

In this embodiment of this application, the foregoing formula is merely used as an example for description of the value of M, and is not used as a specific limitation on the value of M. In this embodiment of this application, the value of M may be determined according to the foregoing formula, or may be determined according to another formula. This falls within the protection scope of this application.

Step S202: The terminal device determines N acknowledgment codebooks, where the N acknowledgment codebooks are used to carry the M-bit acknowledgment information, where both M and N are positive integers, and at least one of M and N is not 1.

In a first example of this application, the N acknowledgment codebooks may be used only to carry the M-bit acknowledgment information for the first downlink data. In an implementation, the N acknowledgment codebooks may be directly used to carry the M-bit acknowledgment information. In another implementation, the terminal device may first divide the M-bit acknowledgment information into N groups of acknowledgment information, and finally include the N groups of acknowledgment information in the N acknowledgment codebooks, in other words, the N acknowledgment codebooks may be used to carry the N groups of acknowledgment information. For a specific implementation in which the N acknowledgment codebooks are used only to carry the acknowledgment information for the first downlink data, refer to descriptions of a procedure shown in FIG. 5.

In the first example, a value of N may be specified in a protocol, or determined based on a quantity of time-frequency resources configured by using higher layer signaling. For example, if the network device configures four time-frequency resources for the terminal device, the terminal device determines that the value of N is 4. In other words, in step S202, four acknowledgment codebooks may be specifically determined. For how the terminal device determines the quantity of time-frequency resources configured by the network device for the terminal device, refer to descriptions of step S203.

In a second example of this application, the N acknowledgment codebooks may be used to carry both the M-bit acknowledgment information for the first downlink data and acknowledgment information for second downlink data, that is, the N acknowledgment codebooks in step S202 may further be used carry the acknowledgment information for the second downlink data in addition to the M-bit acknowledgment information for the first downlink data. A value of N may be specified in a protocol, or may be determined based on a quantity of codebooks for the acknowledgment information for the second downlink data. For example, it can be learned based on a scheduling result of the second downlink data that the acknowledgment information for the second downlink data is to be fed back in three acknowledgment codebooks. In this case, the value of N in step S202 is 3. For a specific implementation in which the N acknowledgment codebooks are used to carry both the acknowledgment information for the first downlink data and the acknowledgment information for the second downlink data, refer to descriptions of procedures shown in FIG. 6A and FIG. 6B.

For the foregoing two examples, the value of N may be 1. To be specific, in this embodiment of this application, one acknowledgment codebook may be used to carry the M-bit acknowledgment information for the first downlink data and/or the acknowledgment information for the second downlink data. In this case, M is greater than 1. Alternatively, the value of N may be greater than 1, that is, a plurality of acknowledgment codebooks may be used to carry the M-bit acknowledgment information and/or the acknowledgment information for the second downlink data. In this case, the value of M may be greater than or equal to 1.

In an example of this application, when the value of N is greater than 1, each of N−1 acknowledgment codebooks in the N acknowledgment codebooks may include floor(M/N)-bit acknowledgment information for the first downlink data, and the remaining acknowledgment codebook other than the N−1 acknowledgment codebooks in the N acknowledgment codebooks may include M−(N−1)*floor(M/N)-bit acknowledgment information for the first downlink data.

Specifically, each of the first N−1 acknowledgment codebooks in the N acknowledgment codebooks includes the floor(M/N)-bit acknowledgment information for the first downlink data, and the last acknowledgment codebook in the N acknowledgment codebooks may include the M−(N−1)*floor(M/N)-bit acknowledgment information for the first downlink data. Alternatively, specifically, the first acknowledgment codebook in the N acknowledgment codebooks includes the M−(N−1)*floor(M/N)-bit acknowledgment information for the first downlink data, and each of the last N−1 acknowledgment codebooks in the N acknowledgment codebooks includes the floor(M/N)-bit acknowledgment information for the first downlink data.

It should be noted that, in this embodiment of this application, the N acknowledgment codebooks may correspond to N indexes, and index numbers are sorted in ascending order. When the index numbers start from 0, the first N−1 acknowledgment codebooks are specifically N−1 acknowledgment codebooks whose index numbers are from 0 to N−2, and the last acknowledgment codebook is specifically an acknowledgment codebook whose index number is N−1; or the first acknowledgment codebook is specifically an acknowledgment codebook whose index number is 0, and the last N−1 acknowledgment codebooks are specifically N−1 acknowledgment codebooks whose index numbers are from 1 to N−1. When the index numbers start from 1, the first N−1 acknowledgment codebooks are specifically N−1 acknowledgment codebooks whose index numbers are from 1 to N−1, and the last acknowledgment codebook is specifically an acknowledgment codebook whose index number is N; or the first acknowledgment codebook is specifically an acknowledgment codebook whose index number is 1, and the last N−1 acknowledgment codebooks are specifically N−1 acknowledgment codebooks whose index numbers are from 2 to N.

In another example of this application, when the value of N is greater than 1, each of the N acknowledgment codebooks may include the M-bit acknowledgment information for the first downlink data.

In still another example of this application, when the value of N is greater than 1, an $i^{th}$ acknowledgment codebook in the N acknowledgment codebooks includes the M-bit acknowledgment information for the first downlink data, where N is a positive integer greater than 1 and i is a positive integer less than or equal to N. That is, only one of the N acknowledgment codebooks includes the M-bit acknowledgment information for the first downlink data, and the remaining N−1 acknowledgment codebooks do not include the acknowledgment information for the first downlink data. A value of i may be specified in a protocol, or may be determined in another manner. This is not limited in this application.

Step S203: The terminal device sends the N acknowledgment codebooks on N time-frequency resources in the target time unit, where each of the N time-frequency resources carries one of the N acknowledgment codebooks.

In this embodiment of this application, for determining the N time-frequency resources by the terminal device, the following examples may be used:

In a first example, the network device may send first indication information to the terminal device, where the first indication information may be used to indicate the N time-frequency resources. The first indication information may be configuration information carried in higher layer signaling, and the configuration information directly indicates the N time-frequency resources. After receiving the first indication information, the terminal device may directly determine the N time-frequency resources based on the indication information.

For the first example, the foregoing process is described in detail by using an example in which the N time-frequency resources are referred to as PUCCH resources, and the first indication information is referred to as PUCCH resource configuration information: The network device may send the PUCCH resource configuration information to the terminal device, where the PUCCH resource configuration information indicates the N PUCCH resources corresponding to the first downlink data. After receiving the PUCCH resource configuration information, the terminal device sends the N acknowledgment codebooks on the N PUCCH resources indicated by the PUCCH resource configuration information.

In a second example, the network device may send second indication information and third indication information to the terminal device, where the second indication information is used to indicate P1 time-frequency resource sets, P1 is a positive integer, and each time-frequency resource set may include N time-frequency resources; and the third indication information is used to indicate an index of a first time-frequency resource set in the P1 time-frequency resource sets. The terminal device may determine, based on the index of the first time-frequency resource set, the N time-frequency resources in the target time unit that are used to transmit the N acknowledgment codebooks. For example, in this embodiment of this application, the terminal device may first receive the second indication information, and then determine the P1 time-frequency resource sets based on the second indication information, where each time-frequency resource set includes N time-frequency resources. Then, the terminal device receives the third indication information, determines the first time-frequency resource set in the P1 time-frequency resource sets based on the third indication information, and finally uses N time-frequency resources included in the first time-frequency resource set as the N time-frequency resources for sending the N acknowledgment codebooks. The second indication information may be carried in higher layer signaling, and the third indication information may be carried in dynamic scheduling signaling. For example, the third indication information is a field in DCI. This is not limited in this application.

For the second example, the foregoing process is described in detail by using an example in which the N time-frequency resources are referred to as PUCCH resources, the second indication information is referred to as PUCCH resource configuration information, and the third indication information is referred to as target indication information: The network device may send the PUCCH resource configuration information to the terminal device, where a plurality of PUCCH resource sets are configured by using the PUCCH resource configuration information, and each PUCCH resource set includes N PUCCH resources. Then, the network device may send the target indication information to the terminal device, where the target indication information is used to indicate a PUCCH resource set. Finally, the terminal device sends the N acknowledgment codebooks on N PUCCH resources corresponding to the resource set.

In a third example, the network device may send fourth indication information and fifth indication information to the terminal device, where the fourth indication information is used to indicate N time-frequency resource sets, and each time-frequency resource set includes P2 time-frequency resources, where P2 is a positive integer; and the fifth indication information is used to indicate an index of a time-frequency resource in each of the N time-frequency resource sets. When receiving the fourth indication information and the fifth indication information, the terminal device may determine, based on the index of the time-frequency resource, the N time-frequency resources in the target time unit that are used to transmit the N acknowledgment codebooks. For example, in this embodiment of this application, the terminal device may first receive the fourth indication information; then determine the N time-frequency resource sets based on the fourth indication information, where each time-frequency resource set includes P2 time-frequency resources; then receive the fifth indication information, where the fifth indication information may indicate a target time-frequency resource in each of the N time-frequency resource sets, to indicate N target time-frequency resources; and finally use the indicated N target time-frequency resources as the N time-frequency resources used to send the N acknowledgment codebooks. The fourth indication information may be carried in higher layer signaling, and the fifth indication information may be carried in dynamic scheduling signaling. For example, the fifth indication information is a field in DCI. This is not limited in this application.

For the third example, the foregoing process is described in detail by using an example in which the N time-frequency resources are referred to as PUCCH resources, the fourth indication information is referred to as PUCCH resource configuration information, and the fifth indication information is referred to as target indication information: The network device may send the PUCCH resource configuration information to the terminal device, where N PUCCH resource sets are configured by using the PUCCH resource configuration information, and each PUCCH resource set includes a plurality of PUCCH resources. Then, the network device may send the target indication information to the terminal device, where the target indication information is used to indicate N PUCCH resources in the N PUCCH resource sets. Finally, the terminal device sends the N acknowledgment codebooks on the N PUCCH resources.

In a fourth example, the network device may send sixth indication information to the terminal device, where the sixth indication information may be used to indicate a plurality of time-frequency resource sets, and each time-frequency resource set may include a plurality of time-frequency resources, for example, eight time-frequency resources to 32 time-frequency resources. For each of the N acknowledgment codebooks, the terminal device may perform the following operation: selecting, based on a size of the acknowledgment codebook and from the plurality of time-frequency resource sets indicated by the sixth indication information, a target time-frequency resource set that matches (or adapts to) the size of the acknowledgment codebook. Then, the terminal device may determine a time-frequency resource in the target time-frequency resource set based on at least one of resource indication information carried on a PDCCH and an indication of a control channel element (CCE) occupied by the PDCCH, and finally send the corresponding acknowledgment codebook on the time-frequency resource.

For the fourth example, the foregoing process is described in detail by using an example in which the time-frequency resource set is referred to as a PUCCH resource set, the time-frequency resource is referred to as a PUCCH resource, and the size of each acknowledgment codebook is referred to as a payload size: The terminal device may first receive a plurality of PUCCH resource sets configured by the network device, then determine a quantity of ACKs/NACKs that need to be fed back in each acknowledgment codebook, namely, the payload size of each acknowledgment codebook, and select a PUCCH resource set based on the payload size of each acknowledgment codebook. Finally, the terminal device specifically selects a PUCCH resource from the PUCCH resource set based on an acknowledgment resource indicator (ARI) on the PDCCH, and finally sends the acknowledgment codebook on the selected PUCCH resource.

Step S204: The network device receives the N acknowledgment codebooks on the N time-frequency resources in the target time unit.

Step S205: The network device determines, based on the N acknowledgment codebooks, whether to retransmit the first downlink data.

In this embodiment of this application, the network device may determine the M-bit acknowledgment information for the first downlink data based on the N acknowledgment codebooks, to determine whether the first downlink data is correctly received by the terminal device.

In an example of this application, in the M-bit acknowledgment information carried in the N acknowledgment codebooks, if a piece of acknowledgment information is positive acknowledgment information, the network device may not retransmit first downlink data corresponding to the piece of acknowledgment information; or if a piece of acknowledgment information is negative acknowledgment information, the network device may retransmit first downlink data corresponding to the piece of acknowledgment information.

It should be noted that, in this embodiment of this application, if the network device does not send the first downlink data, but receives, in the N acknowledgment codebooks, the acknowledgment information for the downlink data, the network device may perform no processing on the acknowledgment information for the downlink data, or perform an operation such as discarding the acknowledgment information.

Figure 5:
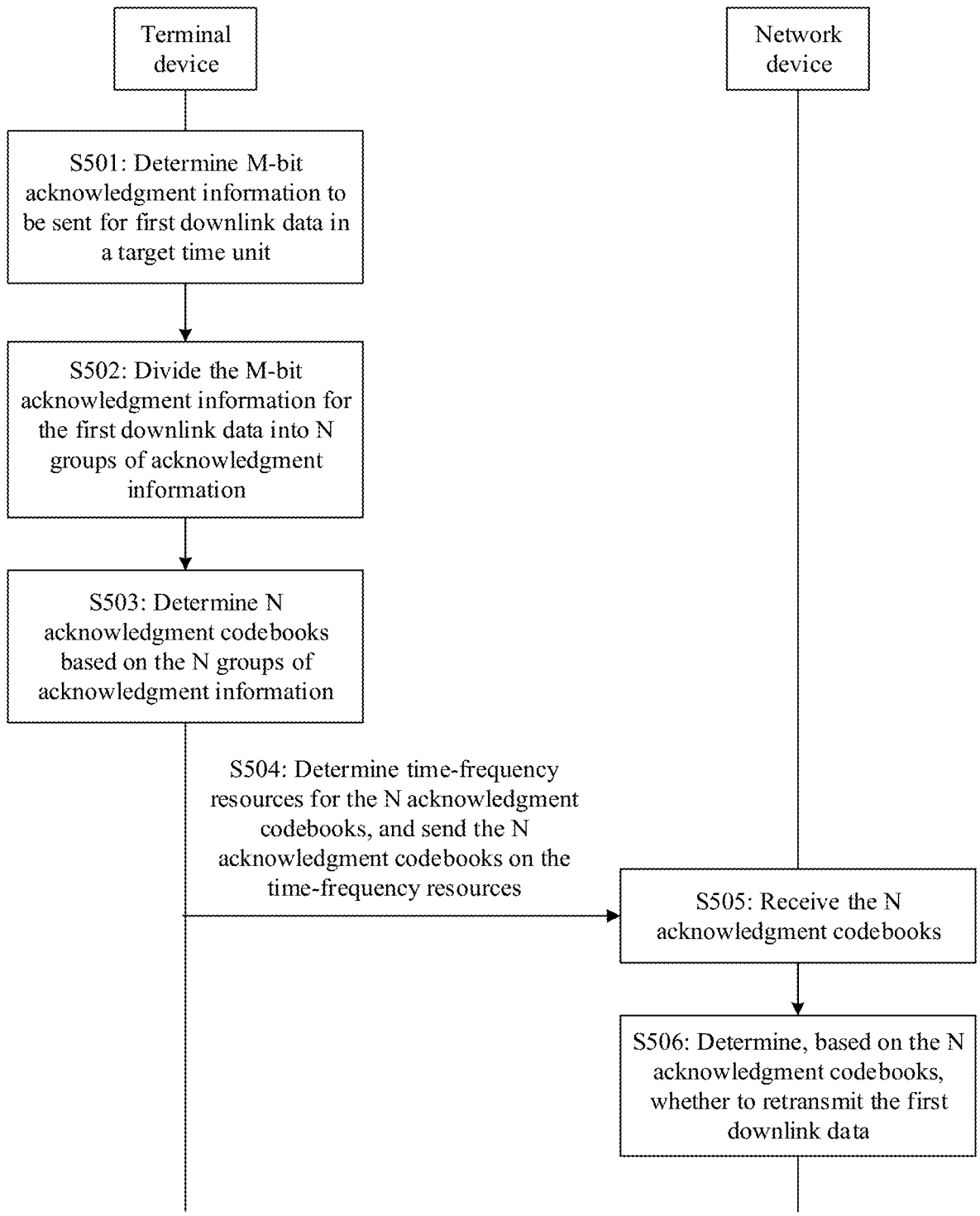
FIG. 5 is a schematic diagram of a communication method according to an embodiment of this application.

As shown in FIG. 5, this application provides a procedure for a communication method. In the procedure shown in FIG. 5, N acknowledgment codebooks may be used only to carry M-bit acknowledgment information for first downlink data. The method procedure shown in FIG. 5 may be a specific implementation, in the procedure shown in FIG. 2, of the case in which the N acknowledgment codebooks are used only to carry the M-bit acknowledgment information for the first downlink data. Details are as follows:

Step S501: A terminal device determines the M-bit acknowledgment information to be sent for the first downlink data in a target time unit.

For a specific example, refer to the descriptions set forth in step S201. Details are not described herein again.

Step S502: The terminal device divides the M-bit acknowledgment information for the first downlink data into N groups of acknowledgment information.

In an example of this application, when a value of N is greater than 1, each of N−1 groups of acknowledgment information in the N groups of acknowledgment information may include floor(M/N)-bit acknowledgment information for the first downlink data, and the remaining group of acknowledgment information other than the N−1 groups of acknowledgment information in the N groups of acknowledgment information may include M−(N−1)*floor(M/N)-bit acknowledgment information for the first downlink data.

Specifically, each of the first N−1 groups of acknowledgment information in the N groups of acknowledgment information may include the floor(M/N)-bit acknowledgment information for the first downlink data, and the last group of acknowledgment information in the N groups of acknowledgment information may include the M−(N−1)*floor(M/N)-bit acknowledgment information for the first downlink data.

Alternatively, specifically, the first group of acknowledgment information in the N groups of acknowledgment information includes the M−(N−1)*floor(M/N)-bit acknowledgment information for the first downlink data, and each of the last N−1 groups of acknowledgment information in the N groups of acknowledgment information may include the floor(M/N)-bit acknowledgment information for the first downlink data.

It should be noted that, in this embodiment of this application, the N groups of acknowledgment information may correspond to N indexes, and index numbers are sorted in ascending order. When the index numbers start from 0, the first N−1 groups of acknowledgment information are specifically N−1 groups, of acknowledgment information, whose index numbers are from 0 to N−2, and the last group of acknowledgment information is specifically a group, of acknowledgment information, whose index number is N−1; or the first group of acknowledgment information is specifically a group, of acknowledgment information, whose index number is 0, and the last N−1 groups of acknowledgment information are specifically N−1 groups, of acknowledgment information, whose index numbers are from 1 to N−1. When the index numbers start from 1, the first N−1 groups of acknowledgment information are specifically N−1 groups, of acknowledgment information, whose index numbers are from 1 to N−1, and the last group of acknowledgment information is specifically a group, of acknowledgment information, whose index number is N; or the first group of acknowledgment information is specifically a group, of acknowledgment information, whose index number is 1, and the last N−1 groups of acknowledgment information are specifically N−1 groups, of acknowledgment information, whose index numbers are from 2 to N.

In an example of this application, when a value of N is greater than 1, each of the N groups of acknowledgment information may include the M-bit acknowledgment information for the first downlink data.

In an example of this application, when a value of N is greater than 1, an $i^{th}$ group of acknowledgment information in the N groups of acknowledgment information may include the M-bit acknowledgment information, where N is a positive integer greater than 1 and i is a positive integer less than or equal to N. That is, only one of the N groups of acknowledgment information includes the M-bit acknowledgment information for the first downlink data, and the remaining N−1 groups of acknowledgment codebooks do not include the acknowledgment information for the first downlink data. A value of i may be specified in a protocol, or may be determined in another manner. This is not limited in this application.

In another example of this application, the M-bit acknowledgment information for the first downlink data may be divided into the N groups of acknowledgment information based on a time domain position of the first downlink data. For example, the first downlink data may be divided into N groups based on the time domain position of the first downlink data, and acknowledgment information corresponding to each group of downlink data forms one group of acknowledgment information. Therefore, the N groups of downlink data correspond to the N groups of acknowledgment information. For example, a total of M1 pieces of acknowledgment information corresponding to downlink data in the first half slot form one group of acknowledgment information, and a total of M2 pieces of acknowledgment information corresponding to downlink data in the second half slot form one group of acknowledgment information, where a value of M1+M2 is M.

Step S503: The terminal device determines the N acknowledgment codebooks based on the N groups of acknowledgment information.

In this embodiment of this application, the terminal device may directly generate the N acknowledgment codebooks by using the N groups of acknowledgment information in step S502. In other words, each group of acknowledgment information is an acknowledgment codebook.

Step S504: The terminal device determines time-frequency resources for the N acknowledgment codebooks, and sends the N acknowledgment codebooks on the time-frequency resources.

For a specific example, refer to the descriptions set forth in step S203. Details are not described herein again.

Step S505: A network device receives the N acknowledgment codebooks.

Step S506: The network device determines, based on the N acknowledgment codebooks, whether to retransmit the first downlink data.

In this embodiment of this application, the network device determines the M-bit acknowledgment information for the first downlink data based on the N acknowledgment codebooks, to determine whether the first downlink data is correctly transmitted.

It should be noted that, in this embodiment of this application, an execution sequence of step S501 to step S506 is not limited, and step S502 and step S503 may be combined into one step. The step obtained after the combination may be: The terminal device generates the N acknowledgment codebooks, where the N acknowledgment codebooks are used to carry the N groups of acknowledgment information, and the N groups of acknowledgment information are generated based on the M-bit acknowledgment information for the first downlink data.

In this embodiment of this application, a plurality of pieces of acknowledgment information to be sent in the target time unit are divided into a plurality of groups, a plurality of acknowledgment codebooks are generated, and the plurality of acknowledgment codebooks are fed back on a plurality of time-frequency resources. In this case, a time-frequency resource used to feed back an acknowledgment codebook for downlink data that arrives at the terminal device earlier is located, in time domain, before a time-frequency resource used to feed back an acknowledgment codebook for downlink data that arrives at the terminal device later. Compared with a manner in which the acknowledgment codebooks for all the downlink data are obtained and then simultaneously fed back on the time-frequency resources, this embodiment can reduce a feedback latency.

In an example, the terminal device may feed back the acknowledgment information in the following manner: The terminal device first determines whether there is an acknowledgment codebook to be fed back for second downlink data in the target time unit, and if there is the acknowledgment codebook to be fed back for the second downlink data in the target time unit, the terminal device adds the acknowledgment information for the first downlink data after the acknowledgment codebook for the second downlink data, or if there is no acknowledgment codebook to be fed back for the second downlink data in the target time unit, the terminal device separately generates the acknowledgment codebooks for the first downlink data. However, in the procedure shown in FIG. 5 in this application, regardless of whether there is the acknowledgment codebook to be fed back for the second downlink data in the target time unit, the terminal device directly generates the acknowledgment codebooks for the first downlink data, and separately feeds back the acknowledgment codebooks for the first downlink data in the target time unit. In this embodiment of this application, the acknowledgment information for the first downlink data is separately fed back, and is not added after the feedback information for the second downlink data that is normally scheduled, to ensure reliability of the acknowledgment information for the first downlink data.

In addition, a quantity of bits of the acknowledgment information is calculated based on a periodicity P of the first downlink data and a length Q of the target time unit, to overcome a technical defect in the prior art that only 1-bit acknowledgment information is fed back, and resolve a problem that acknowledgment information for some downlink data cannot be fed back, thereby improving data transmission efficiency.

Figure 6A:
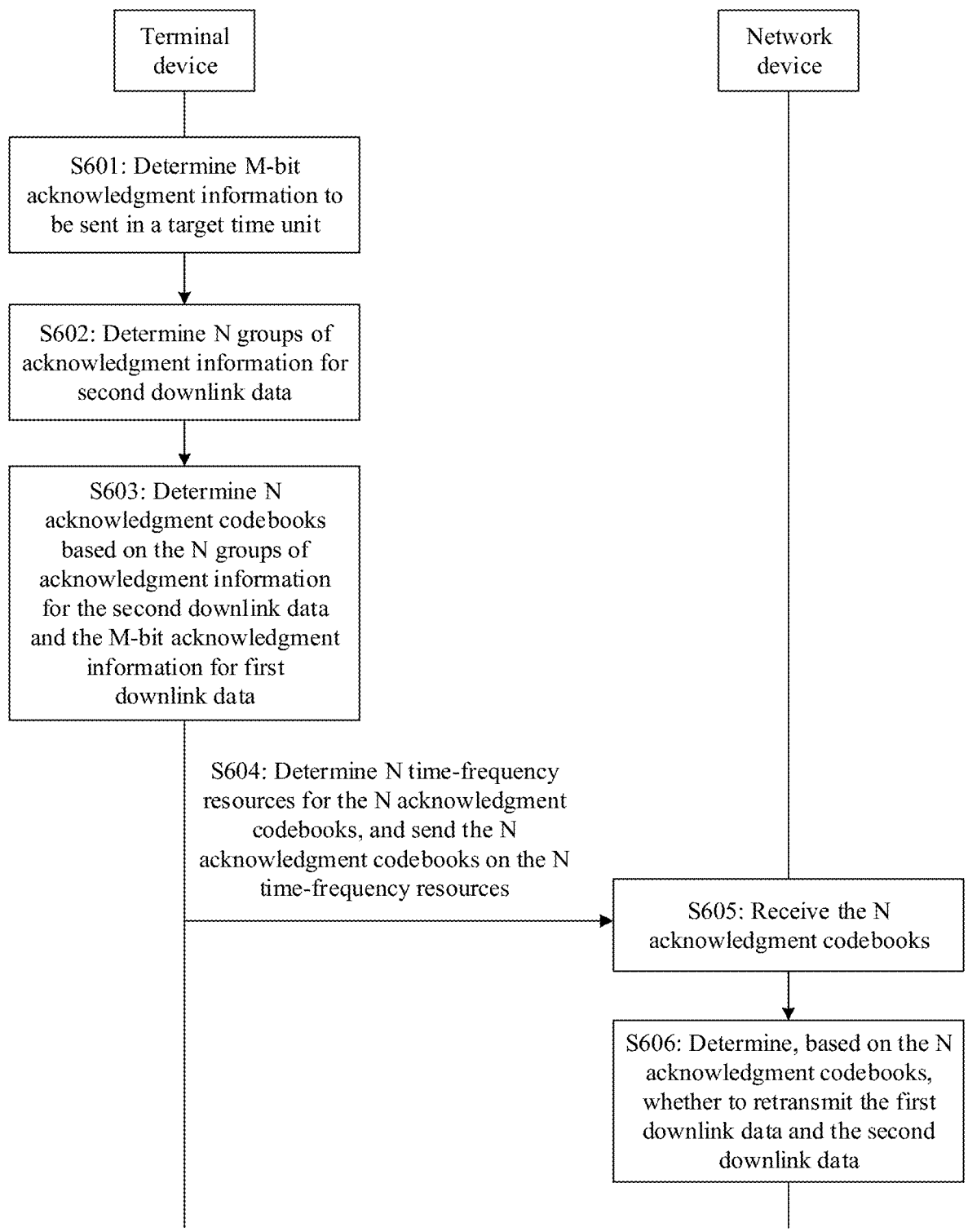
FIG. 6A is a schematic diagram of a communication method according to an embodiment of this application.

As shown in FIG. 6A, this application provides a procedure for a communication method. In the procedure shown in FIG. 6A, N codebooks are used to carry acknowledgment information for first downlink data and acknowledgment information for second downlink data. Specifically, the N codebooks are used to carry M-bit acknowledgment information for the first downlink data and the acknowledgment information for the second downlink data. For example, the method procedure shown in FIG. 6A may be a specific implementation, in the procedure in FIG. 2, of the case in which the N acknowledgment codebooks are used to carry both the M-bit acknowledgment information for the first downlink data and the acknowledgment information for the second downlink data. Details are as follows:

Step S601: A terminal device determines the M-bit acknowledgment information to be sent in a target time unit.

For a process of determining the M-bit acknowledgment information, refer to the descriptions of step S201 in FIG. 2.

Step S602: The terminal device determines N groups of acknowledgment information for the second downlink data.

In an example of this application, the terminal device may determine the N groups of acknowledgment information for the second downlink data based on a time domain position of the second downlink data. Specifically, the second downlink data may be divided into N groups based on the time domain position occupied by the second downlink data, and each group of second downlink data corresponds to one group of acknowledgment information. In this way, the N groups of acknowledgment information for the second downlink data can be generated. For example, second downlink data whose time domain position is in the first half slot forms one group, and second downlink data whose time domain position is in the second half slot forms one group. In this way, two groups of acknowledgment information are generated in total. The time domain position of the second downlink data may be indicated by using DCI corresponding to the second downlink data.

In another example of this application, the terminal device may determine the N groups of acknowledgment information for the second downlink data based on a time domain length occupied by the second downlink data. Specifically, the second downlink data may be divided into N groups based on the time domain length occupied by the second downlink data. For example, second downlink data whose time domain lengths correspond to some values (for example, two symbols, four symbols, and seven symbols) may be grouped into one group, and second downlink data whose time domain lengths correspond to some other values (for example, more than seven symbols) is grouped into one group. In this way, two groups of acknowledgment information are generated in total. The time domain length occupied by the second downlink data may be indicated by using DCI corresponding to the second downlink data. In this manner, different groups of feedback information may be generated for second downlink data having different time domain lengths, and may be fed back separately, to meet latency and reliability requirements of different services. For example, second downlink data having a shorter time domain length may be data of a more urgent service, for example, an ultra-reliable and low-latency communication (URLLC) service, and second downlink data having a longer time domain length may be data of a service with a lower latency requirement, for example, data of an enhanced mobile broadband (eMBB) service. Feedback information corresponding to the second downlink data having the different time domain lengths is divided into groups for separate feedback, so that a latency and reliability of feedback information of the URLLC service can be ensured.

In another example of this application, the terminal device may determine the N groups of acknowledgment information for the second downlink data based on a mapping type of the second downlink data. Specifically, second downlink data whose mapping type is a type A may be grouped into one group, and second downlink data whose mapping type is a type B may be grouped into one group. In this way, two groups of acknowledgment information are generated in total. The mapping type of the second downlink data may be indicated by using DCI corresponding to the second downlink data. In this manner, different groups of feedback information may be generated for second downlink data having different mapping types, and may be fed back separately, to meet latency and reliability requirements of different services. For example, the second downlink data whose mapping type is the type A may be data of a more urgent service, for example, data of a URLLC service, and the second downlink data whose mapping type is the type B may be data of a service with a lower latency requirement, for example, data of an eMBB service. Feedback information corresponding to the second downlink data having the different mapping types is divided into groups for separate feedback, so that a latency and reliability of feedback information of the URLLC service can be ensured.

In a specific implementation of this application, for example, that the mapping type of the second downlink data is the type A may mean that a demodulation reference signal (DMRS) corresponding to the second downlink data occupies the third or fourth symbol in a slot; and that the mapping type of the second downlink data is the type B may mean that a DMRS corresponding to the second downlink data occupies the first symbol on a time domain resource occupied by the second downlink data. Because the data latency requirement of the eMBB service is not very high, in most cases, scheduling is performed in a unit of a slot. To facilitate data demodulation, a DMRS corresponding to data is usually fixed on the second or third symbol in a slot. Because a data latency requirement of the URLLC service is relatively high, in most cases, scheduling is performed in a unit of a symbol. Scheduled data may be at any position in a slot. To facilitate data demodulation, a position of a DMRS corresponding to the data varies with a time domain resource occupied by the data, and is fixed on the first symbol on the time domain resource occupied by the data.

In this embodiment of this application, the terminal device may determine the N groups of acknowledgment information for the second downlink data based on a DCI format corresponding to the second downlink data. Specifically, second downlink data corresponding to one or more DCI formats may be grouped into one group, and each group of second downlink data corresponds to one group of acknowledgment information. In this way, the N groups of acknowledgment information for the second downlink data can be generated. For example, second downlink data corresponding to a DCI format 1 is grouped into one group, and second downlink data corresponding to a DCI format 2 is grouped into one group. In this way, two groups of acknowledgment information are generated in total. In this manner, different groups of feedback information may be generated for second downlink data scheduled in different DCI formats, and may be fed back separately, to meet latency and reliability requirements of different services. For example, the second downlink data corresponding to the DCI format 1 may be data of a more urgent service, for example, data of a URLLC service, and second downlink data scheduled in the DCI format 2 may be data of a service with a lower latency requirement, for example, data of an eMBB service. Feedback information corresponding to the second downlink data scheduled in the different DCI formats is divided into groups for separate feedback, so that a latency and reliability of feedback information of the URLLC service can be ensured.

In still another example of this application, the terminal device may determine the N groups of acknowledgment information for the second downlink data based on a scrambling manner of DCI corresponding to the second downlink data. Specifically, the second downlink data may be divided into N groups based on different scrambling manners of the DCI, and each group of second downlink data corresponds to one group of acknowledgment information. In this way, the N groups of acknowledgment information for the second downlink data can be generated. For example, second downlink data corresponding to DCI that is scrambled in a scrambling manner 1 is grouped into one group, and second downlink data corresponding to DCI that is scrambled in a scrambling manner 2 is grouped into one group. In this way, two groups of acknowledgment information are generated in total. The DCI may be specifically scrambled by using a radio network temporary identifier (RNTI). That is, second downlink data scheduled by using DCI that is scrambled by using different RNTIs corresponds to different groups. In this manner, different groups of feedback information may be generated for the second downlink data scheduled by using the DCI that is scrambled by using different RNTIs, and may be fed back separately, to meet latency and reliability requirements of different services. For example, second downlink data scheduled by using DCI that is scrambled by using an RNTI 1 may be data of a more urgent service, for example, data of a URLLC service, and second downlink data scheduled by using DCI that is scrambled by using an RNTI 2 may be data of a service with a lower latency requirement, for example, data of an eMBB service.

In another example of this application, the terminal device may determine the N groups of acknowledgment information for the second downlink data based on a time domain interval position in which the acknowledgment information corresponding to the second downlink data is located. Specifically, second downlink data whose corresponding acknowledgment information is located in a time domain interval may be grouped into one group, to obtain N groups in total, and each group of second downlink data corresponds to one group of acknowledgment information. In this way, the N groups of acknowledgment information for the second downlink data can be generated. For example, second downlink data whose corresponding acknowledgment information is located in the first half slot is grouped into one group, and second downlink data whose corresponding acknowledgment information is located in the second half slot is grouped into one group. A group of acknowledgment information is generated for each group of second downlink data. In this way, two groups of acknowledgment information are generated in total. In this manner, different groups of feedback information may be generated based on different time domain interval positions in which the acknowledgment information for the second downlink data is located, and may be fed back separately, to meet latency requirements of different services. The acknowledgment information that can be fed back for the second downlink data in the first half slot does not need to be fed back together with the acknowledgment information that is fed back in the second half slot, thereby reducing a feedback latency. The time domain interval position in which the acknowledgment information corresponding to the second downlink data is located may be determined based on DCI corresponding to the second downlink data. For example, DCI of some second downlink data indicates to feed back acknowledgment information for the second downlink data in the first time domain interval, and DCI of some other second downlink data indicates to feed back acknowledgment information for the second downlink data in the second time domain interval.

Step S603: The terminal device determines the N acknowledgment codebooks based on the N groups of acknowledgment information for the second downlink data and the M-bit acknowledgment information for the first downlink data.

In this embodiment of this application, the terminal device may first divide the M-bit acknowledgment information for the first downlink data into N groups of acknowledgment information for the first downlink data, and then respectively add the N groups of acknowledgment information for the first downlink data after or before the N groups of acknowledgment information for the second downlink data, to form the final N acknowledgment codebooks that are to be sent. For a process in which the terminal device divides the M-bit acknowledgment information for the first downlink data into the N groups of acknowledgment information for the first downlink data, refer to the descriptions of step S502 in FIG. 5. For a process of determining the N groups of acknowledgment information for the second downlink data, refer to the descriptions of step S602.

In this embodiment of this application, it is assumed that the N acknowledgment codebooks that are to be sent are formed according to the foregoing method. For a quantity of pieces of acknowledgment information, for the first downlink data, included in each acknowledgment codebook, refer to the descriptions of step S202 in FIG. 2. Details are not described herein again. It should be noted that in this embodiment of this application, any one of the formed N acknowledgment codebooks that are to be sent may include only the acknowledgment information for the first downlink data, or may include only the acknowledgment information for the second downlink data, or may include both the acknowledgment information for the first downlink data and the acknowledgment information for the second downlink data.

For example, in this embodiment of this application, a specific implementation is provided for the descriptions in step S202 that "only one of the N acknowledgment codebooks includes the M-bit acknowledgment information for the first downlink data, and the remaining N−1 acknowledgment codebooks do not include the acknowledgment information for the first downlink data". For example, in this embodiment of this application, the N acknowledgment codebooks formed according to the foregoing method are sorted in ascending order of indexes, and are separately the first acknowledgment codebook, the second acknowledgment codebook, . . . , and the $N^{th}$ acknowledgment codebook. In this case, the first acknowledgment codebook may include the M-bit acknowledgment information for the first downlink data, and any one of the second acknowledgment codebook to the $N^{th}$ acknowledgment codebook may not include the acknowledgment information for the first downlink data, that is, the M-bit acknowledgment information is added after or before the first group of acknowledgment information for the second downlink data, to form the first acknowledgment codebook; and the second group of acknowledgment information for the second downlink data to the $N^{th}$ group of acknowledgment information for the second downlink data directly form the second acknowledgment codebook to the $N^{th}$ acknowledgment codebook. Alternatively, the $N^{th}$ acknowledgment codebook may include the M-bit acknowledgment information for the first downlink data, and each of the first acknowledgment codebook to the $(N-1)^{th}$ acknowledgment codebook does not include the acknowledgment information for the first downlink data, that is, the M-bit acknowledgment information for the first downlink data is added after or before the $N^{th}$ group of acknowledgment information for the second downlink data, to form the $N^{th}$ acknowledgment codebook; and the first group of acknowledgment information for the second downlink data to the $(N-1)^{th}$ group of acknowledgment information for the second downlink data directly form the second acknowledgment codebook to the $(N-1)^{th}$ acknowledgment codebook.

For another example, in this embodiment of this application, a specific implementation is provided for the descriptions in step S202 that "each of the N acknowledgment codebooks may include the M-bit acknowledgment information for the first downlink data". Similarly, in this embodiment of this application, the N acknowledgment codebooks formed according to the foregoing method are sorted in ascending order of indexes, and are separately the first acknowledgment codebook, the second acknowledgment codebook, . . . , and the $N^{th}$ acknowledgment codebook. Each of the first acknowledgment codebook to the $N^{th}$ acknowledgment codebook includes the M-bit acknowledgment information, that is, the M-bit acknowledgment information is added after or before each group of acknowledgment information for the second downlink data, to form the first acknowledgment codebook to the $N^{th}$ acknowledgment codebook.

Step S604: The terminal device determines N time-frequency resources corresponding to the N acknowledgment codebooks, and sends the N acknowledgment codebooks to a network device on the N time-frequency resources.

For a process of determining the N time-frequency resources corresponding to the N acknowledgment codebooks and sending the N acknowledgment codebooks to the network device on the N time-frequency resources, refer to the descriptions of step S203 in FIG. 2.

Step S605: The network device receives the N acknowledgment codebooks.

Step S606: The network device determines, based on the N groups of acknowledgment codebooks, whether to retransmit the first downlink data and the second downlink data.

In this embodiment of this application, if the acknowledgment information in the codebook corresponding to the first downlink data is an ACK, the first downlink data may not be retransmitted; or if the acknowledgment information in the codebook corresponding to the first downlink data is a NACK, the first downlink data is retransmitted. Similarly, if the acknowledgment information in the acknowledgment codebook corresponding to the second downlink data is an ACK, the second downlink data may not be retransmitted; or if the acknowledgment information in the acknowledgment codebook corresponding to the second downlink data is a NACK, the second downlink data is retransmitted.

In this embodiment of this application, the feedback information for the first downlink data is added after or before the feedback information for the second downlink data that is normally scheduled, and then fed back together with the feedback information for the second downlink data that is normally scheduled, to reduce implementation complexity.

In this embodiment of this application, a quantity of bits of the acknowledgment information that is fed back is calculated based on a periodicity P of the first downlink data and a length Q of the target time unit, to avoid that only 1-bit acknowledgment information is fed back, and ensure feedback reliability.

Figure 6B:
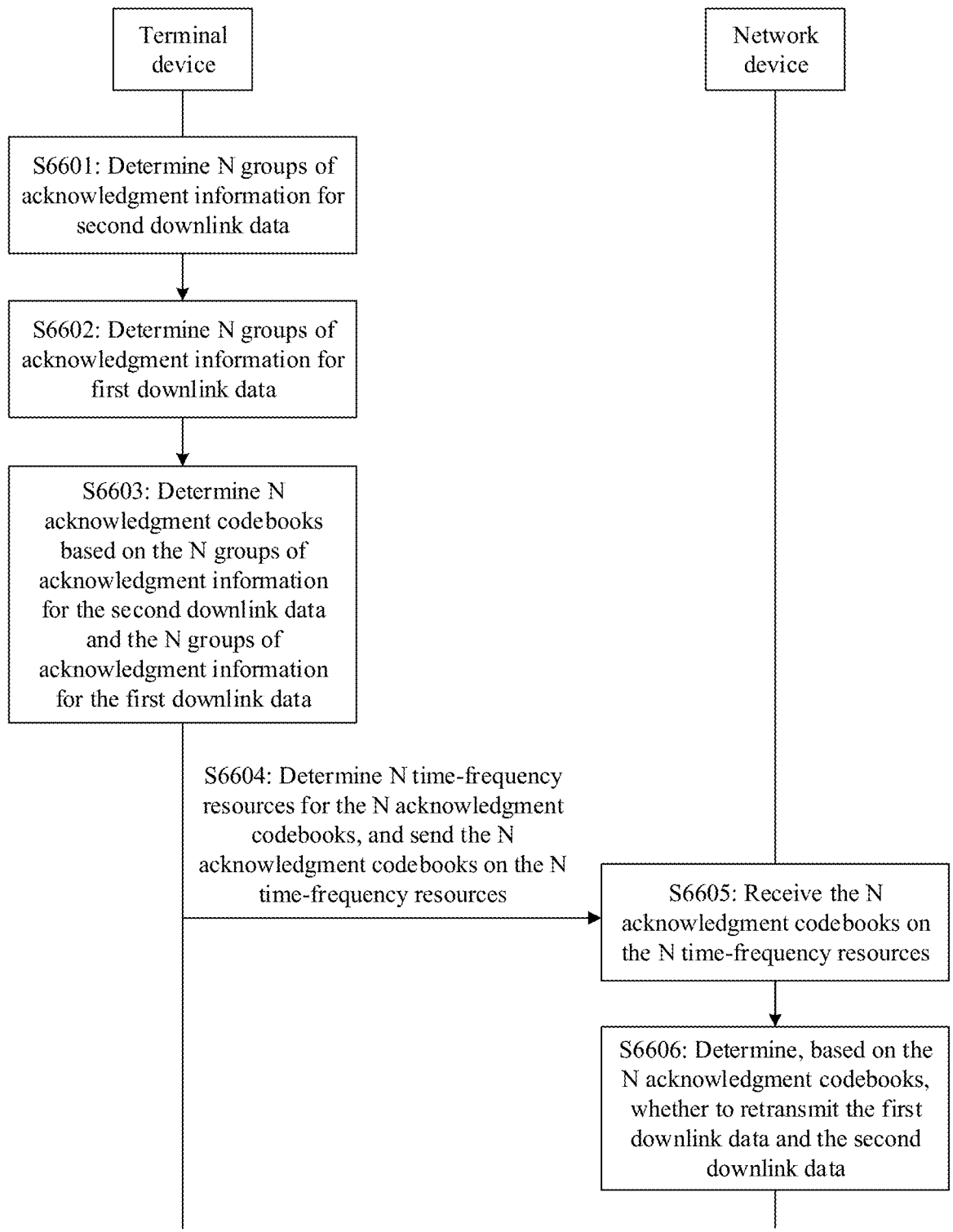
FIG. 6B is a schematic diagram of a communication method according to an embodiment of this application.

As shown in FIG. 6B, this application provides a procedure for a communication method. In the procedure shown in FIG. 6B, N codebooks are used to carry acknowledgment information for first downlink data and acknowledgment information for second downlink data. For example, the method procedure shown in FIG. 6B may be a specific implementation, in the procedure shown in FIG. 2, of the case in which the N acknowledgment codebooks are used for both the acknowledgment information for the first downlink data and the acknowledgment information for the second downlink data. Details are as follows:

Step S6601: A terminal device determines N groups of acknowledgment information for the second downlink data.

In this embodiment of this application, for a process of determining the N groups of acknowledgment information for the second downlink data, refer to the descriptions of step S602 in FIG. 6A.

Step S6602: The terminal device determines N groups of acknowledgment information for the first downlink data.

In this embodiment of this application, the determining, by the terminal device, N groups of acknowledgment information for the first downlink data is related to the process, in step S6601, in which the terminal device determines the N groups of acknowledgment information for the second downlink data. The following provides descriptions with reference to specific examples.

In an example of this application, in step S6601, if the terminal device determines the N groups of acknowledgment information for the second downlink data based on a time domain position of the second downlink data, the terminal device also determines the N groups of acknowledgment information for the first downlink data based on a time domain position of the first downlink data. Specifically, if the second downlink data is divided into N groups based on the time domain position occupied by the second downlink data, the first downlink data is also divided into N groups based on the time domain position of the first downlink data, and each group of first downlink data corresponds to one group of acknowledgment information. In this way, the N groups of acknowledgment information for the first downlink data can be generated. For example, first downlink data whose time domain position is in the first half slot forms one group, first downlink data whose time domain position is in the second half slot forms one group, and a group of acknowledgment information is generated for each group of first downlink data. In this way, two groups of acknowledgment information are generated in total. The time domain position of the first downlink data may be indicated by using activation DCI corresponding to the first downlink data, or may be configured by using higher layer signaling.

In another example of this application, in step S6601, if the terminal device determines the N groups of acknowledgment information for the second downlink data based on a time domain length occupied by the second downlink data, the terminal device also uses a same time domain length-based division method, and determines the N groups of acknowledgment information for the first downlink data based on a time domain length occupied by the first downlink data. For example, first downlink data whose time domain lengths correspond to some values (for example, two symbols, four symbols, and seven symbols) may be grouped into one group, and first downlink data whose time domain lengths correspond to some other values (for example, more than seven symbols) is grouped into one group. In this way, two groups of acknowledgment information are generated in total. The time domain length occupied by the first downlink data may be indicated by using activation DCI corresponding to the first downlink data, or may be configured by using higher layer signaling.

In another example of this application, in step S6601, if the terminal device determines the N groups of acknowledgment information for the second downlink data based on a mapping type of the second downlink data, the terminal device also uses a same mapping type-based division method, and determines the N groups of acknowledgment information for the first downlink data based on a mapping type of the first downlink data. For example, first downlink data whose mapping type is a type A is grouped into one group, and first downlink data whose mapping type is a type B is grouped into one group. In this way, two groups of acknowledgment information are generated in total. The mapping type of the first downlink data may be indicated by using DCI corresponding to the first downlink data, or may be configured by using higher layer signaling.

In another example of this application, in step S6601, if the terminal device determines the N groups of acknowledgment information for the second downlink data based on a DCI format corresponding to the second downlink data, the terminal device also uses a same DCI format-based division method, and determines the N groups of acknowledgment information for the first downlink data based on a DCI format corresponding to the first downlink data. For example, first downlink data corresponding to one or more DCI formats may be grouped into one group, to obtain N groups in total, and each group of first downlink data corresponds to one group of acknowledgment information. In this way, the N groups of acknowledgment information for the first downlink data can be generated. For example, first downlink data corresponding to a DCI format 1 is grouped into one group, first downlink data corresponding to a DCI format 2 is grouped into one group, and a group of acknowledgment information is generated for each group of first downlink data. In this way, two groups of acknowledgment information are generated in total.

In another example of this application, in step S6601, if the terminal device determines the N groups of acknowledgment information for the second downlink data based on a scrambling manner of DCI corresponding to the second downlink data, the terminal device also uses a same DCI scrambling manner-based division method, and determines the N groups of acknowledgment information for the first downlink data based on a scrambling manner of DCI corresponding to the first downlink data. Specifically, first downlink data corresponding to DCI that is scrambled in one or more scrambling manners may be grouped into one group, to obtain N groups in total, and each group of first downlink data corresponds to one group of acknowledgment information. In this way, the N groups of acknowledgment information for the first downlink data can be generated. For example, first downlink data corresponding to DCI that is scrambled in a scrambling manner 1 is grouped into one group, first downlink data corresponding to DCI that is scrambled in a scrambling manner 2 is grouped into one group, and a group of acknowledgment information is generated for each group of first downlink data. In this way, two groups of acknowledgment information are generated in total. The DCI may be scrambled by using a radio network temporary identifier (RNTI).

In another example of this application, in step S6601, if the terminal device determines the N groups of acknowledgment information for the second downlink data based on a time domain interval position in which the acknowledgment information corresponding to the second downlink data is located, the terminal device also uses a same method for performing division based on a time domain interval position in which acknowledgment information is located, and determines the N groups of acknowledgment information for the first downlink data based on a time domain interval position in which the acknowledgment information corresponding to the first downlink data is located. Specifically, first downlink data whose corresponding acknowledgment information is located in a time domain interval may be grouped into one group, to obtain N groups in total, and each group of first downlink data corresponds to one group of acknowledgment information. In this way, the N groups of acknowledgment information for the first downlink data can be generated. For example, first downlink data whose corresponding acknowledgment information is located in the first half slot is grouped into one group, and first downlink data whose corresponding acknowledgment information is located in the second half slot is grouped into one group. In this way, two groups of acknowledgment information are generated in total. The time domain interval position in which the acknowledgment information corresponding to the first downlink data is located may be determined based on DCI corresponding to the first downlink data, or may be configured by using higher layer signaling. For example, DCI of some first downlink data indicates to feed back acknowledgment information for the first downlink data in the first time domain interval, and DCI of some other first downlink data indicates to feed back acknowledgment information for the first downlink data in the second time domain interval.

Step S6603: The terminal device determines the N acknowledgment codebooks based on the N groups of acknowledgment information for the second downlink data and the N groups of acknowledgment information for the first downlink data.

In this embodiment of this application, the terminal device adds the N groups of acknowledgment information for the first downlink data after or before the corresponding N groups of acknowledgment information for the second downlink data, to form the final N acknowledgment codebooks that are to be sent.

Step S6604: The terminal device determines N time-frequency resources corresponding to the N acknowledgment codebooks, and sends the N acknowledgment codebooks to a network device on the N time-frequency resources.

For a process of determining the N time-frequency resources, refer to the descriptions of step S203 in FIG. 2.

Step S6605: The network device receives the N acknowledgment codebooks on the N time-frequency resources.

Step S6606: The network device determines, based on the N acknowledgment codebooks, whether to retransmit the first downlink data and the second downlink data.

In this embodiment of this application, the feedback information for the first downlink data is added after or before the feedback information for the first downlink data that is normally scheduled, and then fed back together with the feedback information for the second downlink data that is normally scheduled, to reduce implementation complexity.

In the embodiments of this application, the network device may send indication information, where the indication information may be carried in higher layer signaling, and the indication information is used to instruct the terminal device to send the acknowledgment information according to the method shown in FIG. 5, or send the acknowledgment information according to the method shown in FIG. 6A or FIG. 6B. Correspondingly, the network device also receives the acknowledgment information according to the method shown in FIG. 5, FIG. 6A, or FIG. 6B.

Figure 7A:
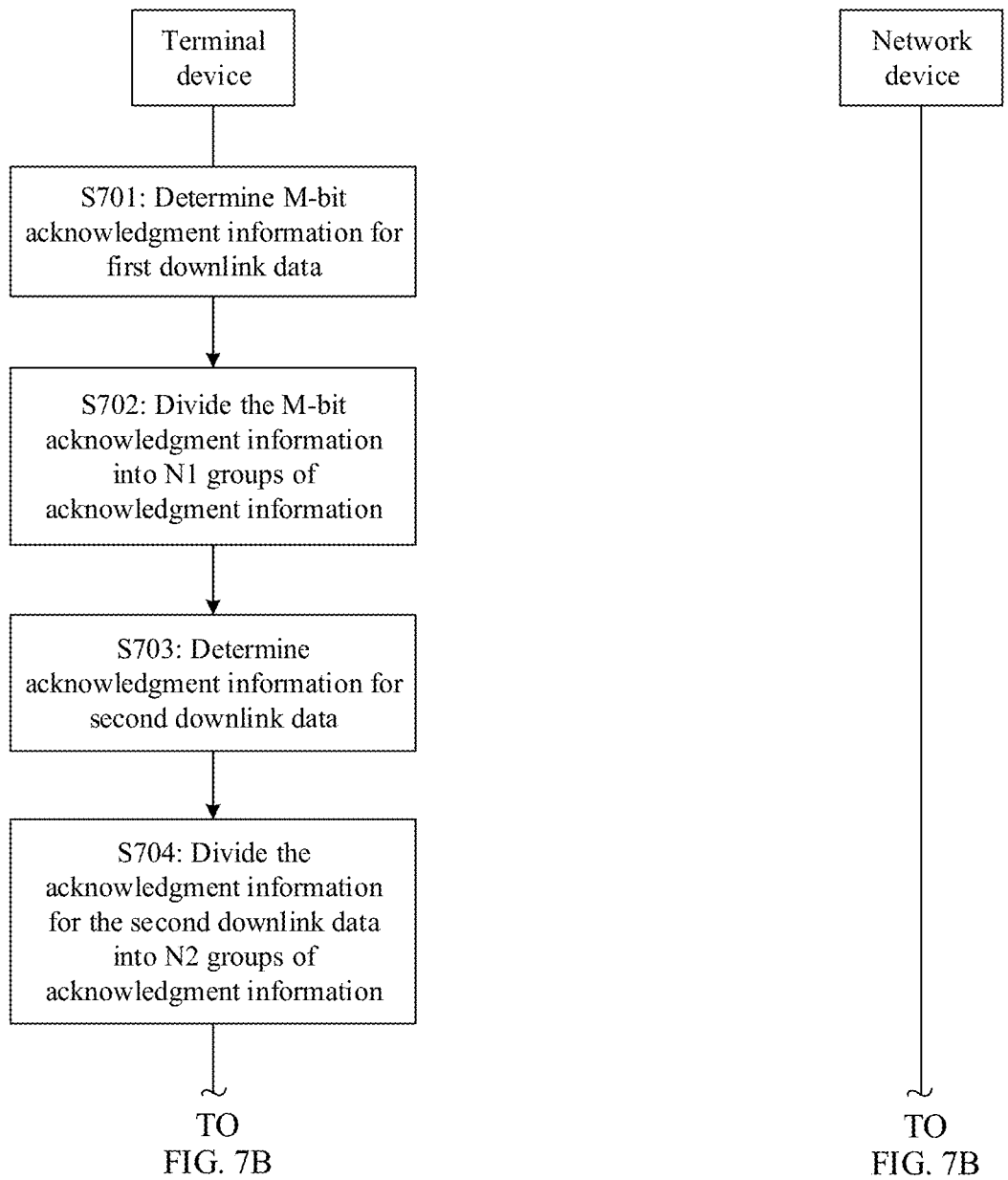
FIG. 7A and FIG. 7B are a schematic diagram of a communication method according to an embodiment of this application.
Figure 7B:
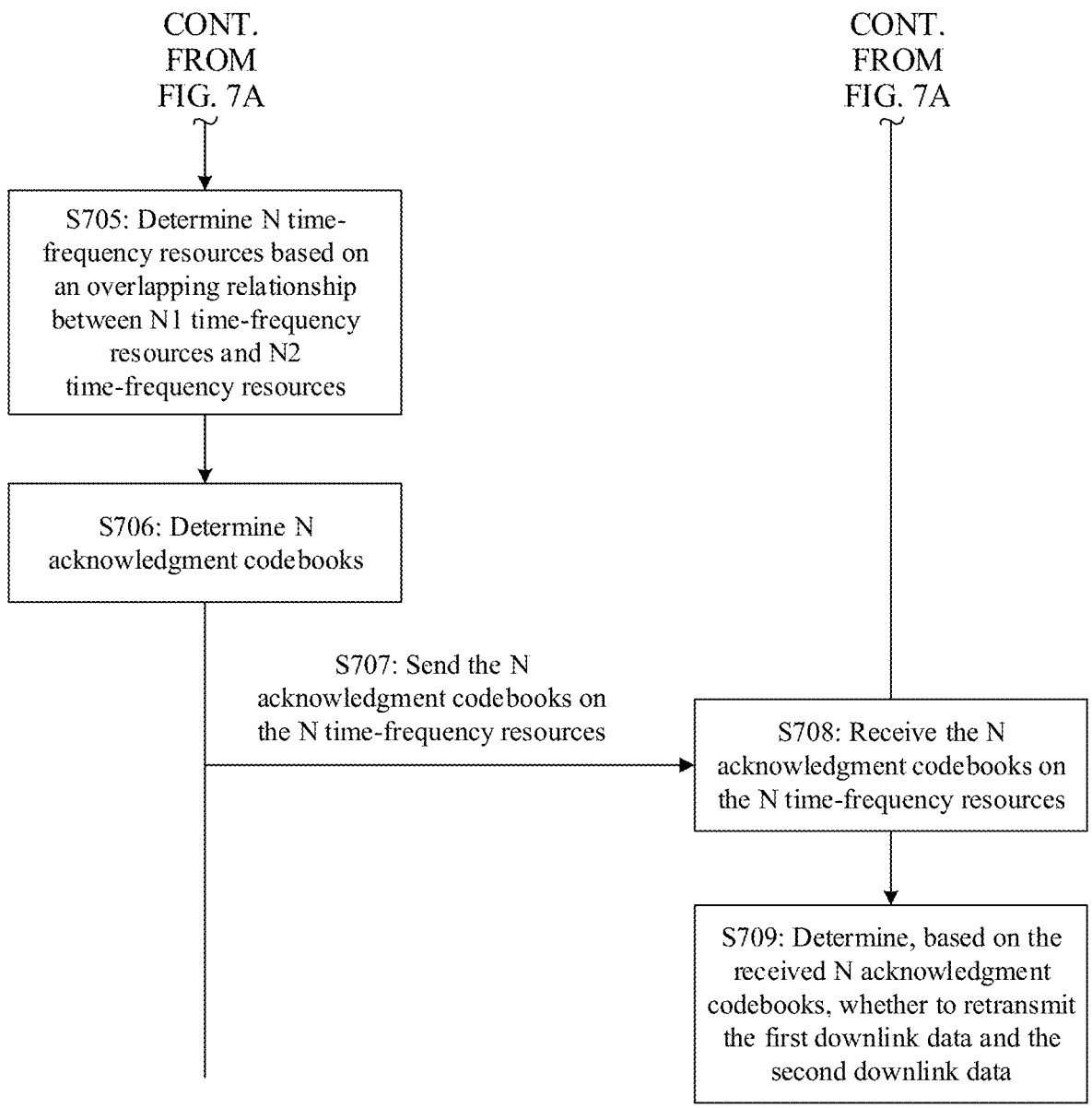

FIG. 7A and FIG. 7B are a flowchart of a communication method according to this application. A network device in the flowchart may be the network device 101 shown in FIG. 1, and a terminal device may be the terminal device 102 shown in FIG. 1. It may be understood that in this application, a function of the network device may alternatively be implemented by using a chip used in the network device, and a function of the terminal device may alternatively be implemented by using a chip used in the terminal device. Details may be as follows:

Step S701: The terminal device determines M-bit acknowledgment information for first downlink data.

For a process of determining the M-bit acknowledgment information, refer to the descriptions of step S201 in FIG. 2.

Step S702: The terminal device divides the M-bit acknowledgment information into N1 groups of acknowledgment information.

Each group of acknowledgment information corresponds to one time-frequency resource, and the N1 groups of acknowledgment information correspond to N1 time-frequency resources in total. For a process of determining the N1 time-frequency resources, refer to step S203 in FIG. 2.

Step S703: The terminal device determines acknowledgment information for second downlink data.

Step S704: The terminal device divides the acknowledgment information for the second downlink data into N2 groups of acknowledgment information.

Each group of acknowledgment information corresponds to one time-frequency resource, and the N2 groups of acknowledgment information correspond to N2 time-frequency resources in total. For a process of determining the N2 time-frequency resources, refer to step S203 in FIG. 2.

Step S705: The terminal device determines N time-frequency resources based on an overlapping relationship between the N1 time-frequency resources and the N2 time-frequency resources.

If the N1 time-frequency resources do not overlap the N2 time-frequency resources at all, a value of N is a sum of N1 and N2. Correspondingly, the N time-frequency resources are the N1 time-frequency resources and the N2 time-frequency resources.

If the N1 time-frequency resources overlap the N2 time-frequency resources, a value of N is less than a sum of N1 and N2. Correspondingly, the N time-frequency resources include three parts: K1 time-frequency resources that are in the N1 time-frequency resources and that do not overlap the N2 time-frequency resources, K2 time-frequency resources that are in the N2 time-frequency resources and that do not overlap the N1 time-frequency resources, and K3 overlapping time-frequency resources between the N1 time-frequency resources and the N2 time-frequency resources. The K3 time-frequency resources may be notified by using signaling, or may be predefined in a protocol. It should be noted that, in this embodiment of this application, that the N1 time-frequency resources overlap the N2 time-frequency resources may be that the N1 time-frequency resources completely overlap the N2 time-frequency resources, or that the N1 time-frequency resources partially overlap the N2 time-frequency resources.

Step S706: The terminal device determines N acknowledgment codebooks.

The N acknowledgment codebooks correspond to the N time-frequency resources, and each time-frequency resource is used to carry one acknowledgment codebook.

In this embodiment of this application, the acknowledgment codebook may be used only to carry the acknowledgment information for the first downlink data, or may be used only to carry the acknowledgment information for the second downlink data, or may be used to carry both the acknowledgment information for the first downlink data and the acknowledgment information for the second downlink data.

In an example of this application, for a time-frequency resource q in the N time-frequency resources, if the time-frequency resource q is a time-frequency resource that is re-determined based on the overlapping time-frequency resources between the N1 time-frequency resources and the N2 time-frequency resources, an acknowledgment codebook corresponding to the time-frequency resource q may be used to carry both the acknowledgment information for the first downlink data and the acknowledgment information for the second downlink data. If the time-frequency resource q is a time-frequency resource in the N1 time-frequency resources, an acknowledgment codebook corresponding to the time-frequency resource q may be used to carry the acknowledgment information corresponding to the first downlink data. If the time-frequency resource q is a time-frequency resource in the N2 time-frequency resources, an acknowledgment codebook corresponding to the time-frequency resource q may be used to carry the acknowledgment information for the second downlink data.

In another example of this application, for a time-frequency resource p in the N1 time-frequency resources, if the time-frequency resource p overlaps a plurality of time-frequency resources in the N2 time-frequency resources, the overlapping may be complete overlapping or partial overlapping. In this case, acknowledgment information, for the first downlink data, corresponding to the time-frequency resource p may be added before or after acknowledgment information, for the second downlink data, corresponding to one of the plurality of time-frequency resources in the N2 time-frequency resources, to form an acknowledgment codebook; or acknowledgment information, for the first downlink data, corresponding to the time-frequency resource p may be added before or after acknowledgment information, for the second downlink data, corresponding to each of the plurality of time-frequency resources in the N2 time-frequency resources, to form a plurality of acknowledgment codebooks. For example, in this embodiment of this application, in the N2 time-frequency resources, time-frequency resources that overlap the time-frequency resource p are separately a first time-frequency resource, a second time-frequency resource, . . . , and an $R^{th}$ time-frequency resource. In this case, in this embodiment of this application, the acknowledgment information, for the first downlink data, corresponding to the time-frequency resource p may be added before or after only acknowledgment information, for the second downlink data, corresponding to an $I^{th}$ time-frequency resource, to form an acknowledgment codebook, where I is a positive integer greater than or equal to 1 and less than or equal to R. Alternatively, in this embodiment of this application, the acknowledgment information, for the first downlink data, corresponding to the time-frequency resource p may be added after or before acknowledgment information, for the second downlink data, corresponding to each of the first time-frequency resource to the $R^{th}$ time-frequency resource, to form a plurality of acknowledgment codebooks.

It should be noted that, in this embodiment of this application, a sorting sequence of the first time-frequency resource to the $R^{th}$ time-frequency resource is not limited. The R time-frequency resources may be sorted first in time domain and then in frequency domain, may be sorted first in frequency domain and then in time domain, or may be sorted according to another rule. This is not limited herein.

In still another example of this application, for a time-frequency resource p in the N1 time-frequency resources, if the time-frequency resource p overlaps a time-frequency resource r in the N2 time-frequency resources, acknowledgment information, for the first downlink data, corresponding to the time-frequency resource p may be added before or after acknowledgment information, for the second downlink data, corresponding to the time-frequency resource r, to form an acknowledgment codebook.

Step S707: The terminal device sends the N acknowledgment codebooks on the N time-frequency resources.

Step S708: The network device receives the N acknowledgment codebooks on the N time-frequency resources.

Step S709: The network device determines, based on the received N acknowledgment codebooks, whether to retransmit the first downlink data and the second downlink data.

It should be noted that in the procedure shown in FIG. 2, FIG. 5, FIG. 6A, FIG. 6B, or FIG. 7A and FIG. 7B of this application, the network device may transmit the downlink data by using a hybrid automatic repeat request (HARQ) technology. Correspondingly, the acknowledgment codebook fed back by the terminal device may be specifically a HARQ-ACK codebook.

The HARQ technology is a technology formed by combining forward error correction (FEC) coding and an automatic repeat request (ARQ). A main principle is as follows: A transmit end adds redundant information through FEC, so that a receive end can correct some errors; and for an error that cannot be corrected by the receive end, retransmission is performed. A working process is specifically: The transmit end sends a data packet to the receive end, where the data packet carries the redundant information used for error correction. After receiving the data packet, the receive end checks, by using a check code (for example, a CRC code), whether the received data packet has an error. If no error is found in the check, the receive end sends positive acknowledgment information (for example, an ACK) to the transmit end, and after receiving the positive acknowledgment information, the transmit end continues to send a next data packet. If an error is found in the check, and the error cannot be corrected, the receive end sends negative acknowledgment information (for example, a NACK) to the transmit end, and the transmit end resends the data packet. In the embodiments of this application, the acknowledgment information included in the HARQ-ACK acknowledgment codebook may include the positive acknowledgment information and/or the negative acknowledgment information that are/is sent by the receive end.

Figure 8:
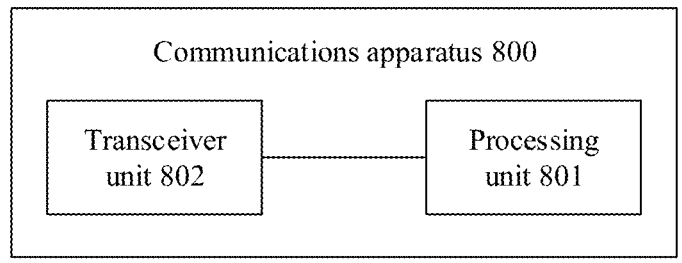
FIG. 8 is a schematic diagram of a communications apparatus according to an embodiment of this application.

Based on the foregoing concept, as shown in FIG. 8, this application provides a communications apparatus 800. The communications apparatus may include a processing unit 801 and a transceiver unit 802.

In an example of this application, the communications apparatus 800 may be used in a terminal device or a chip in a terminal device, and is configured to perform the step performed by the terminal device in the procedure shown in FIG. 2, FIG. 5, FIG. 6A, FIG. 6B, or FIG. 7A and FIG. 7B.

For example, the processing unit 801 may be configured to determine M-bit acknowledgment information to be sent in a target time unit, and determine N acknowledgment codebooks. The M-bit acknowledgment information is acknowledgment information for first downlink data, the first downlink data is transmitted in a semi-persistent scheduling manner, and the N acknowledgment codebooks are used to carry the M-bit acknowledgment information, where both M and N are positive integers, and at least one of M and N is not 1. The transceiver unit 802 may be configured to send the N acknowledgment codebooks on N time-frequency resources in the target time unit, where each of the N time-frequency resources carries one of the N acknowledgment codebooks.

For another example, the processing unit 801 may be configured to: determine M-bit acknowledgment information for first downlink data; divide the M-bit acknowledgment information into N1 groups of acknowledgment information; determine acknowledgment information for second downlink data; divide the acknowledgment information for the second downlink data into N2 groups of acknowledgment information, where each group of acknowledgment information corresponds to one group of time-frequency resources, the N1 groups of acknowledgment information correspond to N1 groups of time-frequency resources in total, and the N2 groups of acknowledgment information correspond to N2 groups of time-frequency resources in total; and determine an acknowledgment codebook based on an overlapping relationship between the N1 groups of time-frequency resources for the first downlink data and the N2 group of time-frequency resources for the second downlink data. The transceiver unit 802 may be configured to send the acknowledgment codebook on a third time-frequency resource.

In an example of this application, the communications apparatus 800 may be used in a network device or a chip in a network device, and is configured to perform the step performed by the network device in the procedure shown in FIG. 2, FIG. 5, FIG. 6A, FIG. 6B, or FIG. 7A and FIG. 7B.

For example, the transceiver unit 802 may be configured to receive N acknowledgment codebooks on N time-frequency resources in a target time unit.

Each of the N time-frequency resources carries one of the N acknowledgment codebooks, and the N acknowledgment codebooks are used to carry M-bit acknowledgment information, where both M and N are positive integers, and at least one of M and N is not 1. The M-bit acknowledgment information is acknowledgment information for first downlink data, and the first downlink data is transmitted in a semi-persistent scheduling manner. The processing unit 801 may be configured to determine, based on the N acknowledgment codebooks, whether to retransmit the first downlink data.

For another example, the transceiver unit 802 may be configured to receive a first codebook on a third time-frequency resource. The processing unit 801 may be configured to determine, based on the first codebook, whether to retransmit first downlink data and second downlink data.

For specific functions of the processing unit 801 and transceiver unit 802, refer to the descriptions of the procedure shown in FIG. 2, FIG. 5, FIG. 6A, FIG. 6B, or FIG. 7A and FIG. 7B. Details are not described herein again.

Figure 9:
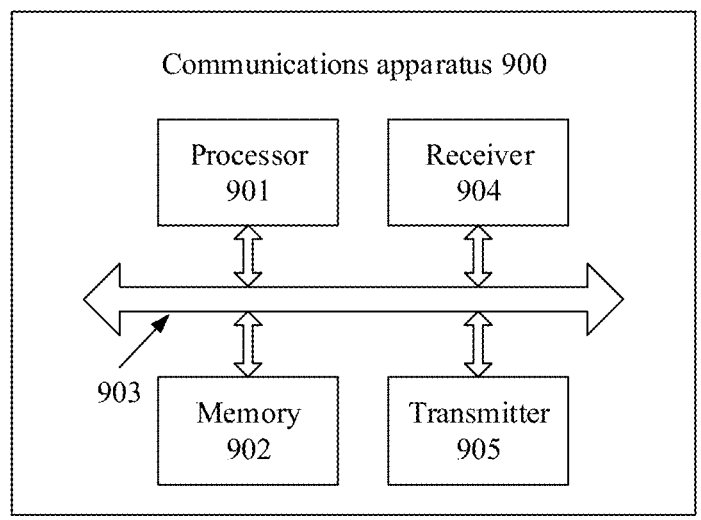
FIG. 9 is a schematic diagram of a communications apparatus according to an embodiment of this application.

Based on the foregoing concept, as shown in FIG. 9, this application further provides a communications apparatus 900. The communications apparatus 900 may be used in the network device or a chip in the network device shown in FIG. 2, FIG. 5, FIG. 6A, FIG. 6B, or FIG. 7A and FIG. 7B, or may be used in the terminal device or a chip in the terminal device show in FIG. 2, FIG. 5, FIG. 6A, FIG. 6B, or FIG. 7A and FIG. 7B. This is not limited herein.

The communications apparatus 900 may include a processor 901 and a memory 902. Further, the apparatus may further include a receiver 904 and a transmitter 905. Further, the apparatus may further include a bus system 903.

The processor 901, the memory 902, the receiver 904, and the transmitter 905 may be connected through the bus system 903. The memory 902 may be configured to store an instruction. The processor 901 may be configured to execute the instruction stored in the memory 902, to control the receiver 904 to receive a signal, and control the transmitter 905 to send a signal, thereby completing the step performed by the network device or the terminal device in the method shown in FIG. 2, FIG. 5, FIG. 6A, FIG. 6B, or FIG. 7A and FIG. 7B.

The receiver 904 and the transmitter 905 may be different physical entities or a same physical entity, and may be collectively referred to as a transceiver. The memory 902 may be integrated into the processor 901, or the memory 902 and the processor 901 may be different physical entities.

In an implementation, functions of the receiver 904 and the transmitter 905 may be considered to be implemented through a transceiver circuit or a dedicated transceiver chip. The processor 901 may be considered to be implemented through a dedicated processing chip, a processing circuit, a processor, or a general-purpose chip.

In another implementation, functions of the network device or the terminal device provided in this embodiment of this application may be considered to be implemented by using a computer. That is, program code for implementing functions of the processor 901, the receiver 904, and the transmitter 905 is stored in the memory 902, and a general-purpose processor may implement the functions of the processor 901, the receiver 904, and the transmitter 905 by executing the code in the memory.

For concepts, explanations, detailed descriptions, and other steps of the communications apparatus 900 that are related to the technical solutions provided in this application, refer to the descriptions of the content in the foregoing methods or other embodiments. Details are not described herein again.

For example, the communications apparatus 900 may be used in the terminal device or the chip in the terminal device, and may be configured to perform the step performed by the terminal device in the procedure shown in FIG. 2. For example, the processor 901 may be configured to determine M-bit acknowledgment information to be sent in a target time unit, where the M-bit acknowledgment information is acknowledgment information for first downlink data, and the first downlink data is transmitted in a semi-persistent scheduling manner. The processor 901 may further be configured to determine N acknowledgment codebooks, where the N acknowledgment codebooks are used to carry the M-bit acknowledgment information, where both M and N are positive integers, and at least one of M and N is not 1. The transmitter 905 may be configured to send the N acknowledgment codebooks on N time-frequency resources in the target time unit, where each of the N time-frequency resources carries one of the N acknowledgment codebooks.

For example, the communications apparatus 900 may be used in the network device or the chip in the network device, and may be configured to perform the step performed by the network device in the procedure shown in FIG. 2. For example, the receiver 904 may be configured to receive N acknowledgment codebooks on N time-frequency resources in a target time unit, where each of the N time-frequency resources carries one of the N acknowledgment codebooks, and the N acknowledgment codebooks are used to carry M-bit acknowledgment information, where both M and N are positive integers, and at least one of M and N is not 1; and the M-bit acknowledgment information is acknowledgment information for first downlink data, and the first downlink data is transmitted in a semi-persistent scheduling manner. The processor 901 may be configured to determine, based on the N acknowledgment codebooks, whether to retransmit the first downlink data.

For another example, the communications apparatus 900 may be used in the terminal device or the chip in the terminal device, and may be configured to perform the step performed by the terminal device in the procedure shown in FIG. 7A and FIG. 7B. For example, the processor 901 may be configured to: determine M-bit acknowledgment information for first downlink data, divide the M-bit acknowledgment information into N1 groups of acknowledgment information, determine acknowledgment information for second downlink data, divide the acknowledgment information for the second downlink data into N2 groups of acknowledgment information, and determine an acknowledgment codebook based on an overlapping relationship between N1 groups of time-frequency resources for the first downlink data and N2 groups of time-frequency resources for the second downlink data. The transmitter 905 may be configured to send the acknowledgment codebook on a third time-frequency resource.

For another example, the communications apparatus 900 may be used in the network device or the chip in the network device, and may be configured to perform the step performed by the network device in the procedure shown in FIG. 7A and FIG. 7B. For example, the receiver 904 may be configured to receive an acknowledgment codebook on a third time-frequency resource. The processor 901 may be configured to determine, based on the acknowledgment codebook, whether to retransmit first downlink data and second downlink data.

For descriptions of the processor 901, the receiver 904, and the transmitter 905, refer to the descriptions of the procedures shown in FIG. 2, FIG. 5, FIG. 6A, FIG. 6B, and FIG. 7A and FIG. 7B. Details are not described herein again.

Figure 10:
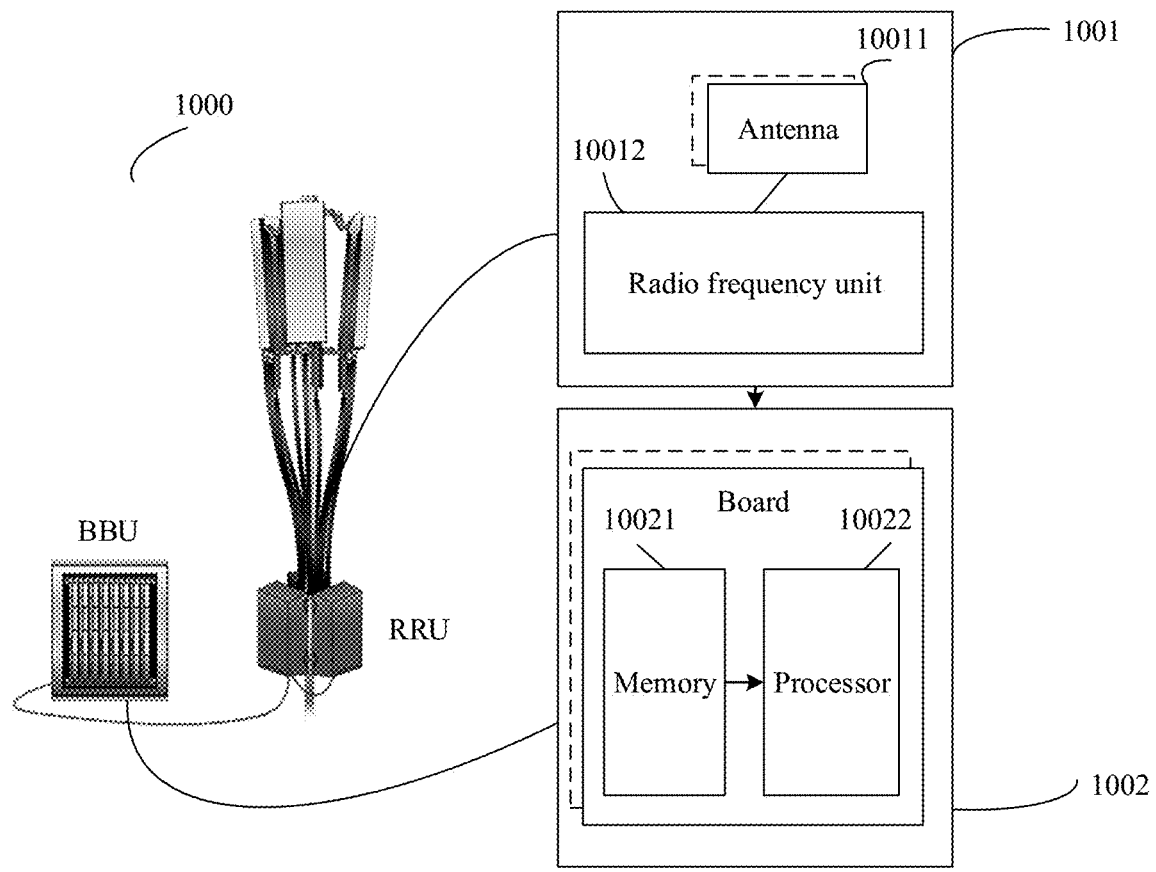
FIG. 10 is a schematic diagram of a network device according to an embodiment of this application.

Based on the same concept, FIG. 10 is a schematic structural diagram of a network device such as a base station 1000 according to this application. The base station may be used in a scenario of the communications system shown in FIG. 1, and the base station may be the network device in the procedures shown in FIG. 2, FIG. 5, FIG. 6A, FIG. 6B, and FIG. 7A and FIG. 7B.

Specifically, the base station 1000 may include one or more radio frequency units, such as a remote radio unit (RRU) 1001 and one or more baseband units (BBU) (which may also be referred to as digital units (DUs) 1002. The RRU 1001 may be a transceiver unit, a transceiver, a transceiver circuit, or the like, and may include at least one antenna 10011 and a radio frequency unit 10012. The RRU 1001 may be configured to send and receive a radio frequency signal and perform conversion between the radio frequency signal and a baseband signal, for example, send N acknowledgment codebooks on N time-frequency resources in a target time unit. The BBU 1002 may be configured to perform baseband processing, control the base station, and so on. The RRU 1001 and the BBU 1002 may be physically disposed together, or may be physically separated, namely, in a distributed base station.

The BBU 1002 is a control center of the base station, may also be referred to as a processing unit, and is configured to complete a baseband processing function such as channel coding, multiplexing, modulation, and spectrum spreading. For example, the BBU (processing unit) may be configured to control the base station to perform the method in the procedure shown in FIG. 2, FIG. 5, FIG. 6A, FIG. 6B, or FIG. 7A and FIG. 7B.

In an example, the BBU 1002 may include one or more boards, and a plurality of boards may jointly support a radio access network (such as an NR network) in a single access standard, or may separately support radio access networks in different access standards. The BBU 1002 may further include a memory 10021 and a processor 10022. The memory 10021 is configured to store an instruction and data that are necessary. For example, the memory 10021 stores an instruction for "determining M-bit acknowledgment information to be sent in a target time unit and determining N acknowledgment codebooks" in the foregoing embodiment. The processor 10022 is configured to control the base station to perform a necessary action. In addition, a necessary circuit may further be disposed on each board.

Figure 11:
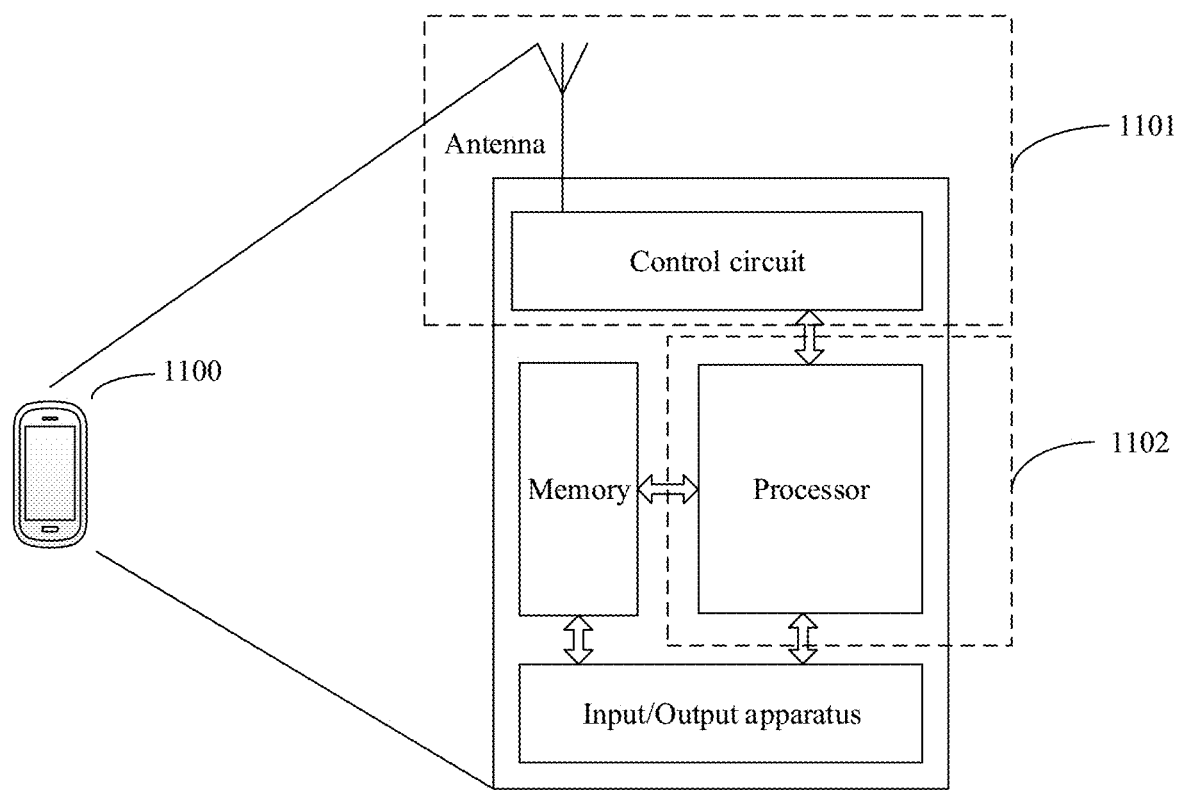
FIG. 11 is a schematic diagram of a terminal device according to an embodiment of this application.

Based on the same concept, FIG. 11 is a schematic structural diagram of a terminal device 1100. The terminal device may be used in the step performed by the terminal device in the procedure shown in FIG. 2, FIG. 5, FIG. 6A, FIG. 6B, or FIG. 7A and FIG. 7B. For ease of description, FIG. 11 shows only main components of the terminal device. As shown in FIG. 11, the terminal device 1100 may include a processor, a memory, and a control circuit. Optionally, the terminal device 1100 may further include an antenna and/or an input/output apparatus. The processor may be configured to: process a communications protocol and communications data, control the terminal device, execute a software program, and process data of the software program. The memory may store the software program and/or the data. The control circuit may be configured to: perform conversion between a baseband signal and a radio frequency signal, and process the radio frequency signal. The control circuit together with the antenna may also be referred to as a transceiver, and may be configured to send and receive a radio frequency signal in an electromagnetic wave form. The input/output apparatus such as a touchscreen, a display, or a keyboard may be configured to receive data entered by a user and output data to the user.

In this embodiment of this application, the processor may read the software program in a storage unit, interpret and execute an instruction of the software program, and process the data of the software program. When data needs to be sent in a wireless manner, the processor performs baseband processing on the to-be-sent data, and then outputs a baseband signal to a radio frequency circuit. After performing radio frequency processing on the baseband signal, the radio frequency circuit sends a radio frequency signal to the outside through the antenna in an electromagnetic wave form. When data is sent to the terminal device, the radio frequency circuit receives a radio frequency signal through the antenna, converts the radio frequency signal into a baseband signal, and outputs the baseband signal to the processor, and the processor converts the baseband signal into data and processes the data.

A person skilled in the art may understand that, for ease of description, FIG. 11 shows only one memory and only one processor. In actual terminal device, there may be a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor may be configured to process the communications protocol and the communications data. The central processing unit may be configured to: control the entire terminal device, execute the software program, and process the data of the software program. The processor in FIG. 11 is integrated with functions of the baseband processor and the central processing unit. A person skilled in the art may understand that, the baseband processor and the central processing unit may alternatively be independent processors, and are interconnected by using a technology such as a bus. A person skilled in the art may understand that the terminal device may include a plurality of baseband processors to adapt to different network standards, the terminal device may include a plurality of central processing units to improve a processing capability of the terminal device, and parts of the terminal device may be connected through various buses. The baseband processor may also be expressed as a baseband processing circuit or a baseband processing chip. The central processing unit may also be expressed as a central processing circuit or a central processing chip. The function of processing the communications protocol and the communications data may be embedded in the processor; or may be stored in the storage unit in a form of a software program, and the processor executes the software program to implement a baseband processing function.

For example, in this embodiment of this application, the antenna that has a transceiver function and the control circuit may be used as a transceiver unit 1101 of the terminal device 1100, and the processor having a processing function may be considered as a processing unit 1102 of the terminal device 1100. As shown in FIG. 11, the terminal device 1100 may include the transceiver unit 1101 and the processing unit 1102. The transceiver unit may also be referred to as a transceiver, a transceiver apparatus, or the like. Optionally, a component that is in the transceiver unit 1101 and that is configured to implement a receiving function may be considered as a receiving unit, and a component that is in the transceiver unit 1101 and that is configured to implement a sending function may be considered as a sending unit. In other words, the transceiver unit 1101 includes the receiving unit and the sending unit. For example, the receiving unit may also be referred to as a receiver, a receive circuit, or the like, and the sending unit may also be referred to as a transmitter, a transmit circuit, or the like.

It should be understood that in the foregoing apparatus embodiments, the network device and the terminal device completely correspond to the network device or the terminal device in the method embodiments. A corresponding module or unit performs a corresponding step. For example, a sending module (transmitter) performs a sending step in the method embodiments, a receiving module (receiver) performs a receiving step in the method embodiments, and steps other than the sending step and the receiving step may be performed by a processing module (processor). For a function of a specific module, refer to the corresponding method embodiments. The sending module and the receiving module may form a transceiver module, and the transmitter and the receiver may form a transceiver, to jointly implement a transceiver function. There may be one or more processors.

According to the methods provided in the embodiments of this application, an embodiment of this application further provides a communications system, including the network device and the terminal device described above.

Based on the foregoing embodiments, an embodiment of this application further provides a computer storage medium. The storage medium stores a software program, and when the software program is read and executed by one or more processors, the method provided in any one or more of the foregoing embodiments may be implemented. The computer storage medium may include: any medium that can store program code, for example, a USB flash drive, a removable hard disk, a read-only memory, a random access memory, a magnetic disk, or an optical disc.

Based on the foregoing embodiments, an embodiment of this application further provides a chip. The chip includes a processor, configured to implement a function in any one or more of the foregoing embodiments, for example, obtain or process the information or the message in the foregoing methods. Optionally, the chip further includes a memory. The memory is configured to store a program instruction and data that are executed by the processor. The chip may also include a chip and another discrete component.

It should be understood that, the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a discrete hardware component, or the like. The general-purpose processor may be a microprocessor, any conventional processor, or the like.

The memory may include a read-only memory and a random access memory, and provide an instruction and data to the processor. A part of the memory may further include a nonvolatile random access memory.

The bus system may further include a power bus, a control bus, a status signal bus, and the like, in addition to a data bus. However, for clear description, various types of buses in the figures are marked as the bus system. In an implementation process, the steps in the foregoing methods may be implemented by using a hardware integrated logic circuit in the processor, or by using instructions in a form of software. The steps of the methods disclosed with reference to the embodiments of this application may be directly performed by a hardware processor, or may be performed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory, and completes the steps in the foregoing methods by using the information in the memory and hardware of the processor. To avoid repetition, details are not described herein again.

In the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. In the text descriptions of this application, the character "/" indicates an "or" relationship between the associated objects. In a formula in this application, the character "/" indicates a "division" relationship between the associated objects.

It may be understood that numerical symbols used in the embodiments of this application are differentiated merely for ease of description, but are not used to limit the scope of the embodiments of this application. Sequence numbers of the foregoing processes do not mean execution sequences, and the execution sequences of the processes should be determined based on functions and internal logic of the processes.

What is claimed is:

1. A communication method, comprising:
determining M-bit acknowledgment information to be sent in a target time unit, wherein the M-bit acknowledgment information is acknowledgment information for first downlink data, and the first downlink data is transmitted in a semi-persistent scheduling manner;
receiving second indication information, wherein the second indication information is used to indicate P1 time-frequency resource sets, P1 is a positive integer, and each time-frequency resource set comprises N time-frequency resources;
receiving third indication information, wherein the third indication information is used to indicate an index of a first time-frequency resource set in the P1 time-frequency resource sets;
determining, based on the index of the first time-frequency resource set, N time-frequency resources in the target time unit;
determining N acknowledgment codebooks, wherein the N acknowledgment codebooks are used to carry the M-bit acknowledgment information, wherein the N time-frequency resources are used to transmit the N acknowledgment codebooks, wherein both M and N are positive integers, and at least one of M and N is not 1; and
sending the N acknowledgment codebooks on the N time-frequency resources in the target time unit, wherein each time-frequency resource of the N time-frequency resources carries one of the N acknowledgment codebooks.

2. The method according to claim 1, wherein a value of M is K*[Q/P], wherein P is a transmission periodicity of the first downlink data, Q is a length of the target time unit, K is a quantity of time units used to transmit the first downlink data, values of P, Q, and K are all positive integers, and [ ] represents rounding Q/P.

3. The method according to claim 1, wherein:
each of N−1 acknowledgment codebooks in the N acknowledgment codebooks comprises floor(M/N)-bit acknowledgment information, and the remaining acknowledgment codebook comprises M−(N−1)*floor(M/N)-bit acknowledgment information, wherein floor represents a rounding down operation, and N is greater than 1; or
each of the N acknowledgment codebooks comprises the M-bit acknowledgment information, wherein N is greater than 1; or
an $i^{th}$ acknowledgment codebook in the N acknowledgment codebooks comprises the M-bit acknowledgment information, wherein N is greater than 1 and i is a positive integer less than or equal to N; or
a value of N is 1, and the acknowledgment codebook comprises the M-bit acknowledgment information.

4. The method according to claim 3,
wherein each of N−1 acknowledgment codebooks in the N acknowledgment codebooks comprises floor(M/N)-bit acknowledgment information, and the remaining acknowledgment codebook comprises M−(N−1)*floor(M/N)-bit acknowledgment information; and
wherein:
each of the first N−1 acknowledgment codebooks in the N acknowledgment codebooks comprises the floor(M/N)-bit acknowledgment information, and the last acknowledgment codebook in the N acknowledgment codebooks comprises the M−(N−1)*floor(M/N)-bit acknowledgment information; or
the first acknowledgment codebook in the N acknowledgment codebooks comprises the M−(N−1)*floor(M/N)-bit acknowledgment information, and each of the last N−1 acknowledgment codebooks in the N acknowledgment codebooks comprises the floor(M/N)-bit acknowledgment information.

5. The method according to claim 1, wherein the N acknowledgment codebooks further comprise acknowledgment information for second downlink data, and the second downlink data is transmitted in a dynamic scheduling manner.

6. An apparatus, comprising:
one or more processors; and
a non-transitory computer readable medium storing a program to be executed by the one or more processors, wherein the program comprises instructions for:
sending second indication information, wherein the second indication information is used to indicate P1 time-frequency resource sets, P1 is a positive integer, and each time-frequency resource set comprises N time-frequency resources;
sending third indication information, wherein the third indication information is used to indicate an index of a first time-frequency resource set in the P1 time-frequency resource sets;
receiving N acknowledgment codebooks on the N time-frequency resources in a target time unit, wherein each of the N time-frequency resources carries one of the N acknowledgment codebooks, and the N acknowledgment codebooks are used to carry M-bit acknowledgment information, wherein both M and N are positive integers, and at least one of M and N is not 1, and wherein the M-bit acknowledgment information is acknowledgment information for first downlink data, and the first downlink data is transmitted in a semi-persistent scheduling manner; and
determining, based on the N acknowledgment codebooks, whether to retransmit the first downlink data.

7. The apparatus according to claim 6, wherein a value of M is K*[Q/P], wherein P is a transmission periodicity of the first downlink data, Q is a length of the target time unit, K is a quantity of time units used to transmit the first downlink data, values of P, Q, and K are all positive integers, and [ ] represents rounding Q/P.

8. The apparatus according to claim 6, wherein:
each of N−1 acknowledgment codebooks in the N acknowledgment codebooks comprises floor(M/N)-bit acknowledgment information, and the remaining acknowledgment codebook comprises M−(N−1)*floor (M/N)-bit acknowledgment information, wherein floor represents a rounding down operation, and N is greater than 1; or each of the N acknowledgment codebooks comprises the M-bit acknowledgment information, wherein N is greater than 1; or an $i^{th}$ acknowledgment codebook in the N acknowledgment codebooks comprises the M-bit acknowledgment information, wherein N is greater than 1 and i is a positive integer less than or equal to N; or a value of N is 1, and the acknowledgment codebook comprises the M-bit acknowledgment information.

9. The apparatus according to claim 8, wherein each of N−1 acknowledgment codebooks in the N acknowledgment codebooks comprises floor(M/N)-bit acknowledgment information, and the remaining acknowledgment codebook comprises M−(N−1)*floor(M/N)-bit acknowledgment information; and wherein:

each of the first N−1 acknowledgment codebooks in the N acknowledgment codebooks comprises the floor(M/N)-bit acknowledgment information, and the last acknowledgment codebook in the N acknowledgment codebooks comprises the M−(N−1)*floor(M/N)-bit acknowledgment information; or the first acknowledgment codebook in the N acknowledgment codebooks comprises the M−(N−1)*floor(M/N)-bit acknowledgment information, and each of the last N−1 acknowledgment codebooks in the N acknowledgment codebooks comprises the floor(M/N)-bit acknowledgment information.

10. An apparatus, comprising:

one or more processors; and a non-transitory computer readable medium storing a program to be executed by the one or more processors, wherein the program comprises instructions for:

determining M-bit acknowledgment information to be sent in a target time unit, wherein the M-bit acknowledgment information is acknowledgment information for first downlink data, and the first downlink data is transmitted in a semi-persistent scheduling manner;

receiving second indication information, wherein the second indication information is used to indicate P1 time-frequency resource sets, P1 is a positive integer, and each time-frequency resource set comprises N time-frequency resources;

receiving third indication information, wherein the third indication information is used to indicate an index of a first time-frequency resource set in the P1 time-frequency resource sets;

determining, based on the index of the first time-frequency resource set, N time-frequency resources in the target time unit;

determining N acknowledgment codebooks, wherein the N acknowledgment codebooks are used to carry the M-bit acknowledgment information, wherein the N time-frequency resources are used to transmit the N acknowledgment codebooks, wherein both M and N are positive integers, and at least one of M and N is not 1; and sending the N acknowledgment codebooks on the N time-frequency resources in the target time unit, wherein each time-frequency resource of the N time-frequency resources carries one of the N acknowledgment codebooks.

11. The apparatus according to claim 10, wherein a value of M is K*[Q/P], wherein P is a transmission periodicity of the first downlink data, Q is a length of the target time unit, K is a quantity of time units used to transmit the first downlink data, values of P, Q, and K are all positive integers, and [ ] represents rounding Q/P.

12. The apparatus according to claim 10, wherein:

each of N−1 acknowledgment codebooks in the N acknowledgment codebooks comprises floor(M/N)-bit acknowledgment information, and the remaining acknowledgment codebook comprises M−(N−1)*floor(M/N)-bit acknowledgment information, wherein floor represents a rounding down operation, and N is greater than 1; or each of the N acknowledgment codebooks comprises the M-bit acknowledgment information, wherein N is greater than 1; or an $i^{th}$ acknowledgment codebook in the N acknowledgment codebooks comprises the M-bit acknowledgment information, wherein N is greater than 1 and i is a positive integer less than or equal to N; or a value of N is 1, and the acknowledgment codebook comprises the M-bit acknowledgment information.

13. The apparatus according to claim 12, wherein each of N−1 acknowledgment codebooks in the N acknowledgment codebooks comprises floor(M/N)-bit acknowledgment information, and the remaining acknowledgment codebook comprises M−(N−1)*floor(M/N)-bit acknowledgment information; and wherein:

each of the first N−1 acknowledgment codebooks in the N acknowledgment codebooks comprises the floor(M/N)-bit acknowledgment information, and the last acknowledgment codebook in the N acknowledgment codebooks comprises the M−(N−1)*floor(M/N)-bit acknowledgment information; or the first acknowledgment codebook in the N acknowledgment codebooks comprises the M−(N−1)*floor(M/N)-bit acknowledgment information, and each of the last N−1 acknowledgment codebooks in the N acknowledgment codebooks comprises the floor(M/N)-bit acknowledgment information.

14. The apparatus according to claim 10, wherein the N acknowledgment codebooks further comprise acknowledgment information for second downlink data, and the second downlink data is transmitted in a dynamic scheduling manner.

* * * * *